US012782723B2

(12) United States Patent
Agemizu et al.

(10) Patent No.: US 12,782,723 B2
(45) Date of Patent: Nov. 3, 2026

(54) OPTICAL SYSTEM, ILLUMINATION SYSTEM, DISPLAY SYSTEM, AND MOVING BODY

(71) Applicant: Panasonic Intellectual Property Management Co., Ltd., Osaka (JP)

(72) Inventors: Wahei Agemizu, Osaka (JP); Kazumasa Takata, Osaka (JP); Masaru Fujita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 310 days.

(21) Appl. No.: 18/488,821

(22) Filed: Oct. 17, 2023

(65) Prior Publication Data

US 2024/0045206 A1 Feb. 8, 2024

Related U.S. Application Data

(63) Continuation of application No. PCT/JP2022/009908, filed on Mar. 8, 2022.

(30) Foreign Application Priority Data

Apr. 28, 2021 (JP) ................................ 2021-076775

(51) Int. Cl.
*G02B 27/01* (2006.01)

(52) U.S. Cl.
CPC .................... *G02B 27/0101* (2013.01); *G02B 2027/0118* (2013.01)

(58) Field of Classification Search
CPC ........................ F21Y 2115/10; F21Y 2115/15; B60K 35/23; B60K 35/10; B60K 35/231;
(Continued)

(56) References Cited

U.S. PATENT DOCUMENTS

2009/0257245 A1* 10/2009 Kim .......................... F21V 7/04
362/626
2012/0063166 A1* 3/2012 Panagotacos ........ G02B 6/0045
362/609

(Continued)

FOREIGN PATENT DOCUMENTS

JP 2008-103300 5/2008
JP 2017-142491 8/2017

(Continued)

OTHER PUBLICATIONS

International Search Report of PCT application No. PCT/JP2022/009908 dated May 10, 2022.

*Primary Examiner* — William R Alexander
*Assistant Examiner* — Kuei-Jen L Edenfield
(74) *Attorney, Agent, or Firm* — Wenderoth, Lind & Ponack, L.L.P.

(57) ABSTRACT

An optical system includes a light guide member, a prism, and a plurality of light control bodies. The light guide member includes an incident surface on which light is incident, and a first surface and a second surface facing each other. In the light guide member, the second surface is an emission surface of light. The prism is provided on the first surface and reflects light passing through the light guide member toward the second surface. The plurality of light control bodies are positioned between light sources and the incident surface. The plurality of light control bodies control light rays output from the light sources and incident on the incident surface. Each of the plurality of light control bodies includes an incident lens. Each of the plurality of light control bodies causes the light incident on the incident lens from the light source to be incident on the incident surface.

12 Claims, 10 Drawing Sheets

(58) Field of Classification Search
CPC ........... B60K 35/60; B60K 35/81; F21V 5/02; F21V 8/00; G02B 27/01; G02B 6/00; G02B 27/00; G02B 27/10; G02B 6/0068; G02B 6/003; G02B 6/0038; G02B 6/0036; F21S 2/00; G02F 1/1335
USPC ............. 359/521, 13–14, 629–633, 558–576
See application file for complete search history.

(56) References Cited

U.S. PATENT DOCUMENTS

| | | | | |
|---|---|---|---|---|
| 2016/0209574 | A1* | 7/2016 | Powell | G02B 6/0031 |
| 2017/0230628 | A1 | 8/2017 | Ichikawa et al. | |
| 2018/0087748 | A1* | 3/2018 | Gladden | F21V 14/06 |
| 2018/0100959 | A1* | 4/2018 | Vasylyev | G02B 3/005 |
| 2019/0265472 | A1* | 8/2019 | Sugiyama | B60K 35/23 |
| 2019/0346676 | A1* | 11/2019 | Hirata | G02B 27/0101 |
| 2021/0364795 | A1 | 11/2021 | Asai | |
| 2022/0043262 | A1 | 2/2022 | Agemizu et al. | |

FOREIGN PATENT DOCUMENTS

| | | |
|---|---|---|
| JP | 2018-077540 | 5/2018 |
| JP | 2020-183979 | 11/2020 |
| WO | 2020/174798 | 9/2020 |

* cited by examiner

OPTICAL SYSTEM, ILLUMINATION SYSTEM, DISPLAY SYSTEM, AND MOVING BODY

TECHNICAL FIELD

The present disclosure generally relates to an optical system, an illumination system, a display system, and a moving body. More specifically, the present disclosure relates to an optical system, an illumination system, a display system, and a moving body that control light incident from an incident surface and emit the light from an emission surface.

BACKGROUND ART

PTL 1 discloses an image display device (display system) that projects a virtual image onto a target space. This image display device is a head-up display (HUD) for an automobile. Projection light that is image light and is emitted from the HUD device (optical system) for an automobile in a dashboard is reflected by a front glass and is directed to a driver who is a viewer. Accordingly, a user (driver) can visually recognize an image such as a navigation image as a virtual image, and can visually recognize the image as if the virtual image is superimposed on a background such as a road surface.

CITATION LIST

Patent Literature

PTL 1: Unexamined Japanese Patent Publication No. 2017-142491

SUMMARY OF THE INVENTION

An optical system according to one aspect of the present disclosure includes a light guide member, a prism, and a plurality of light control bodies. The light guide member includes an incident surface on which light is incident, and a first surface and a second surface facing each other. In the light guide member, the second surface is an emission surface of light. The prism is provided on the first surface and reflects light passing through the light guide member toward the second surface. The plurality of light control bodies are positioned between light sources and the incident surface. The plurality of light control bodies control light rays output from the light sources and incident on the incident surface. Each of the plurality of light control bodies includes an incident lens. Each of the plurality of light control bodies causes the light incident on the incident lens from the light source to be incident on the incident surface. Directions of optical axes of the light rays incident on the incident surface by at least two light control bodies among the plurality of light control bodies are different from each other.

DESCRIPTION OF EMBODIMENT

In the image display device as described in PTL 1, there is a possibility that unevenness is caused in brightness of the image visually recognized by the user.

The present disclosure has been made in view of the above circumstances, and an object thereof is to provide an optical system, an illumination system, a display system, and a moving body capable of reducing unevenness caused in brightness of an image visually recognized by a user.

Optical system 100 (see FIG. 1A), illumination system 200, display system 300 (see FIG. 5), and moving body B1 (see FIG. 6) according to an exemplary embodiment of the present disclosure will be described in detail with reference to the drawings. Note that, exemplary embodiments and modifications to be described below are merely examples of the present disclosure, and the present disclosure is not limited to the exemplary embodiments and the modifications. Even in a case other than exemplary embodiments and the modifications, various changes can be made in accordance with the design and the like without departing from the technical idea of the present disclosure. Furthermore, each drawing described in the following exemplary embodiments is a schematic view, and each ratio of sizes and thicknesses of components in a drawing does not necessarily reflect an actual dimensional ratio. Furthermore, the following exemplary embodiments (including modifications) may be implemented by being appropriately combined.

(1) Outline

First, an outline of optical system 100 according to the present exemplary embodiment and illumination system 200 using optical system 100 will be described with reference to FIGS. 1A to 4.

Figure 1A:
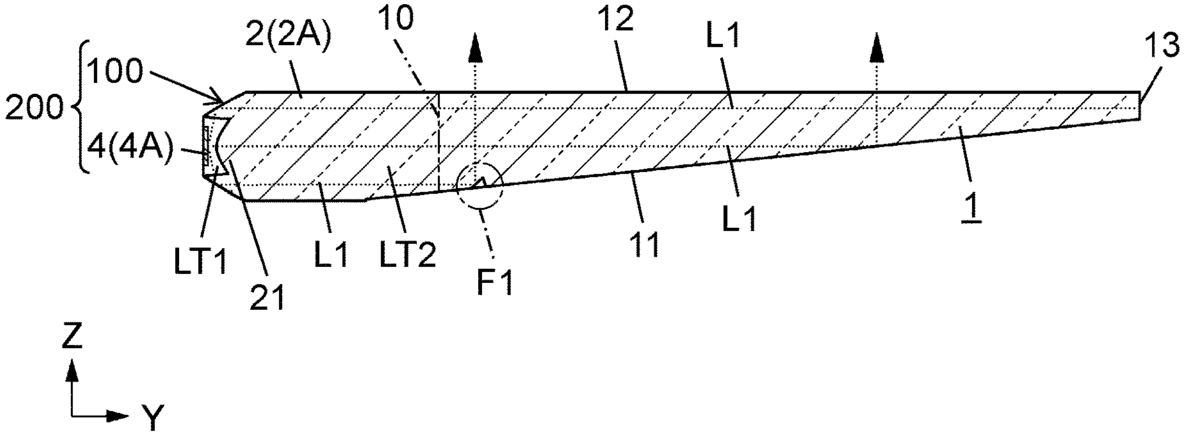
FIG. 1 is a side cross-sectional view illustrating an outline of an optical system according to an exemplary embodiment.
FIG. 1B is an enlarged schematic view of region F1 in FIG. 1A.
Figure 1B:
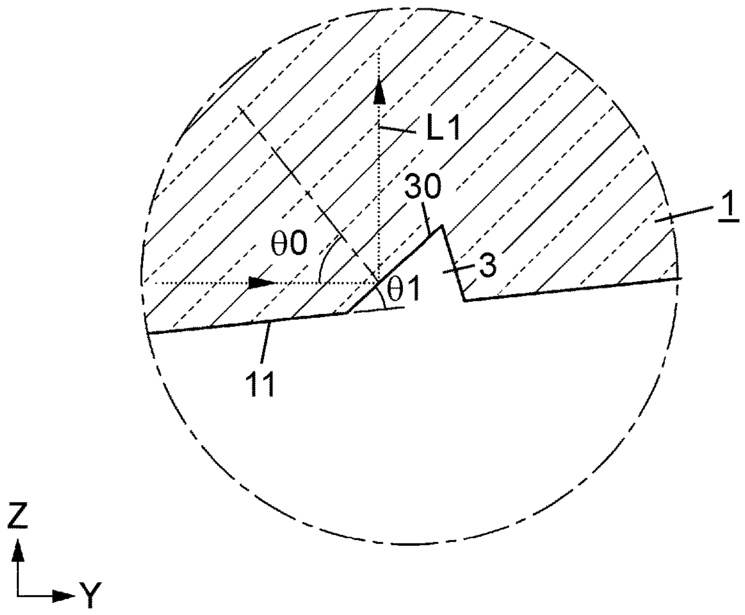

Optical system 100 (see FIGS. 1A and 1B) according to the present exemplary embodiment has a function of controlling light incident from incident surface 10 and emitting light from emission surface (second surface 12). As illustrated in FIGS. 1A and 1B, optical system 100 includes light guide member 1, a plurality of light control bodies 2, and prisms 3.

Optical system 100 constitutes illumination system 200 together with light sources 4. In other words, illumination system 200 according to the present exemplary embodiment includes optical system 100 and light sources 4.

Light sources 4 output light rays incident on incident surface 10. As will be described in detail later, in a case where optical system 100 includes the plurality of light control bodies 2, the light rays from light sources 4 are not directly incident on light guide member 1, but are incident on light guide member 1 through light control bodies 2. That is, the light rays emitted from light sources 4 are incident on incident surface 10 (of light guide member 1) through light control bodies 2.

As described above, in the present exemplary embodiment, optical system 100 further includes the plurality of light control bodies 2 in addition to light guide member 1 and prisms 3. The plurality of light control bodies 2 are positioned between light sources 4 and incident surface 10 of light guide member 1, and control the light rays output from light sources 4 and incident on incident surface 10. In particular, in the present exemplary embodiment, light guide member 1 and the plurality of light control bodies 2 are integrated as an integrally molded product. That is, in the present exemplary embodiment, light guide member 1 and the plurality of light control bodies 2 are formed as the integrally molded product and are in an integrally inseparable relationship. In other words, the plurality of light control bodies 2 are continuously connected to incident surface 10 of light guide member 1 without a seam, and light guide member 1 and the plurality of light control bodies 2 are seamlessly integrated. Thus, in the present exemplary embodiment, incident surface 10 of light guide member 1 is a "virtual surface" defined inside the integrally molded product of light guide member 1 and the plurality of light control bodies 2, and is not accompanied by entity.

In the present exemplary embodiment, light guide member 1 has incident surface 10 on which light is incident, and first surface 11 and second surface 12 facing each other. Second surface 12 is an emission surface of light. Prisms 3 are provided on first surface 11. Prisms 3 reflect light rays passing through an inside of light guide member 1 toward second surface 12.

Figure 2:
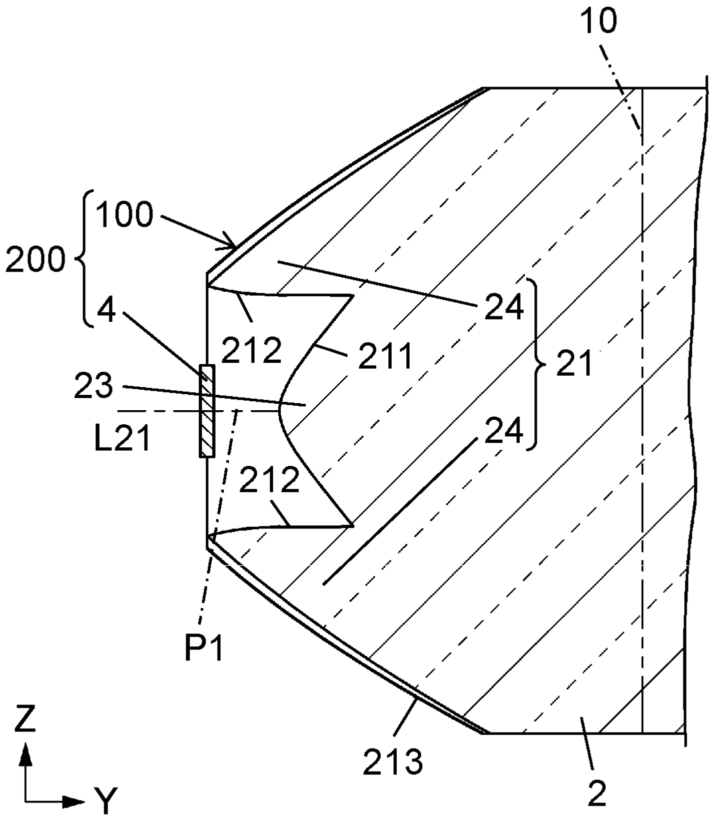
FIG. 2 is a side cross-sectional view illustrating an outline of a light control body of the optical system.

Furthermore, as illustrated in FIG. 2, in the present exemplary embodiment, each of the plurality of light control bodies 2 includes incident lens 21. Each of the plurality of light control bodies 2 causes light rays incident on incident lenses 21 from light sources 4 to be incident on incident surface 10.

Incident lens 21 has main incident surface 211 and sub-incident surface 212. Main incident surface 211 is disposed to face light sources 4. Sub-incident surface 212 is directed to normal line L21 of main incident surface 211. Here, for example, in a case where main incident surface 211 has a dome shape, normal line L21 of main incident surface 211 is a normal line of main incident surface 211 at a distal end (vertex of the dome). Normal line L21 of main incident surface 211 is a "virtual line" and is not accompanied by entity. Sub-incident surface 212 is positioned on at least a part around main incident surface 211. Here, as illustrated in FIG. 1A, optical axes P1 of light rays (first incident light rays LT1) incident from light sources 4 coincide with normal line L21 of main incident surface 211. Furthermore, optical axes P1 are parallel to second surface 12.

Figure 3A:
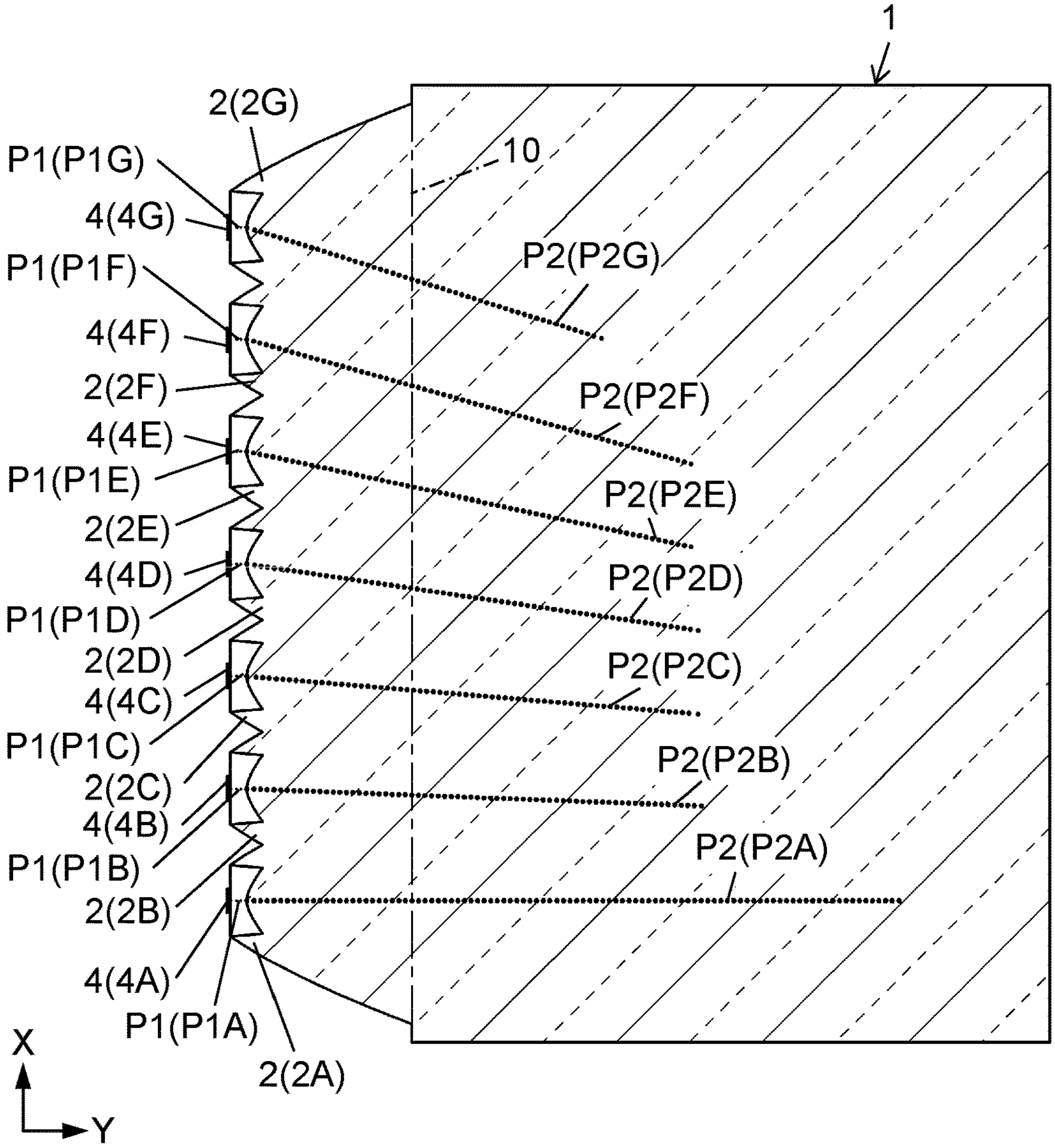
FIG. 3A is a plan cross-sectional view for describing directions of optical axes of light rays in the optical system.
Figure 3B:
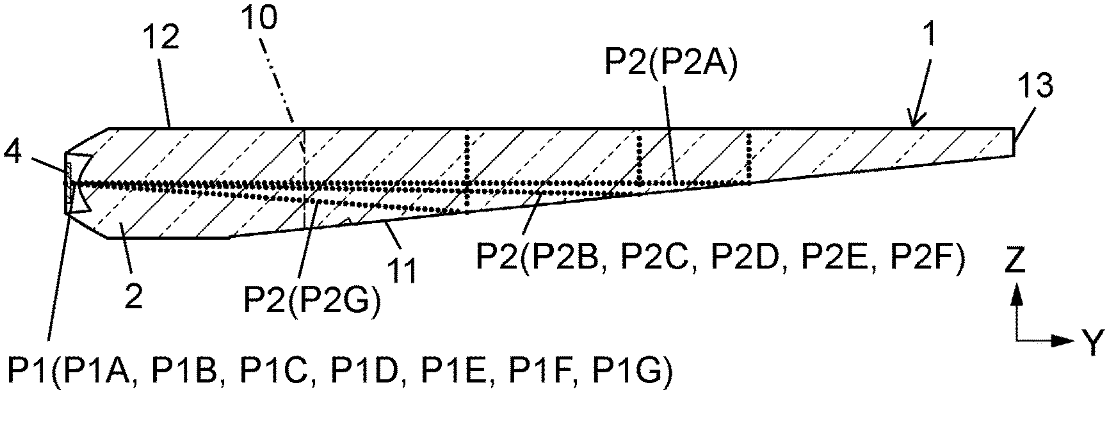
FIG. 3B is a side cross-sectional view for describing the directions of the optical axes of the light rays in the optical system.

Furthermore, the plurality of light control bodies 2 can control directions of optical axes P1 of first incident light rays LT1. Specifically, as illustrated in FIGS. 3A and 3B, first incident light rays LT1 having optical axes P1 are incident, as second incident light rays LT2 having optical axes P2, on incident surface 10 through the plurality of light control bodies 2. Here, optical axes P1 and optical axes P2 may intersect each other or may be parallel to each other. Note that, the term "intersect" referred to herein has the same meaning as an angle formed by optical axis P1 and optical axis P2 is more than 0 degrees. Furthermore, although details will be described later, first incident light rays LT1 are brought close to parallel light by light control bodies 2, and are incident, as second incident light rays LT2, on incident surface 10.

In the present exemplary embodiment, directions of optical axes P2 of second incident light rays LT2 incident on incident surface 10 by at least two light control bodies 2 among the plurality of light control bodies 2 are different from each other. For example, in the present exemplary embodiment, optical system 100 includes seven light control bodies 2 (light control body 2A to light control body 2G). Light control body 2A to light control body 2G are positioned between the plurality of light sources 4 (light source 4A to light source 4G) in a one-to-one correspondence and incident surface 10 of light guide member 1. Furthermore, light control body 2A to light control body 2G are arranged in a width direction of light guide member 1 (a direction in which light source 4A to light source 4G are arranged in FIG. 4). Furthermore, the directions of optical axes P2 (optical axis P2A to optical axis P2G) of second incident light rays LT2 (second incident light LT2A to second incident light LT2G) incident on incident surface 10 from light control body 2A to light control body 2G are different from each other.

First incident light rays LT1 (first incident light LT1A to first incident light LT1G) are incident on light control body 2A to light control body 2G from light source 4A to light source 4G. At this time, as illustrated in FIGS. 3A and 3B, the directions of optical axes P1 (optical axis P1A to optical axis PIG) of first incident light LT1A to first incident light LT1G are all equal and parallel to each other. Furthermore, optical axis P1A to optical axis P1G are parallel to second surface 12 and are perpendicular to incident surface 10. Here, first incident light LT1A to first incident light LT1G are converted into parallel light rays by incident lenses 21 included in light control body 2A to light control body 2G, and are incident, as second incident light LT2A to second incident light LT2G having optical axes P2 (optical axis P2A to optical axis P2G), on incident surface 10. Note that, optical axes P1 and optical axes P2 may intersect or may be parallel. For example, as illustrated in FIGS. 3A and 3B, optical axis P2A of second incident light LT2A is on optical axis P1A of first incident light LT1A, and optical axis P1A and optical axis P2A are parallel. Furthermore, optical axis P2A to optical axis P2G intersect each other. In other words, orientations of optical axis P2A to optical axis P2G are different from each other.

As described above, optical system 100 can control a luminance distribution of emission light rays emitted from the emission surface (second surface 12) by controlling the directions of optical axis P2A to optical axis P2G by light control body 2A to light control body 2G, for example, as illustrated in FIGS. 3A and 3B. Note that, the directions of optical axis P2A to optical axis P2G illustrated in FIGS. 3A and 3B are examples, and the directions of optical axis P2A to optical axis P2G can be appropriately changed such that the emission light rays emitted from second surface 12 has a desired luminance distribution. Here, the emission light rays are planar light rays generated by second incident light LT2A to second incident light LT2G reflected by prisms 3, and the luminance distribution of the emission light rays is a light amount distribution of the emission light rays on second surface 12.

(2) Details

Hereinafter, optical system 100, illumination system 200 using optical system 100, display system 300 using illumination system 200, and moving body B1 according to the present exemplary embodiment will be described in detail with reference to FIGS. 1A to 13.

(2.1) Premises

In the following description, a width direction of light guide member 1 (a direction in which the plurality of light sources 4 are arranged in FIG. 4) is referred to as an "X-axis direction", and a depth direction of light guide member 1 (a direction in which light rays from the light source are incident on incident surface 10 in FIG. 1A) is referred to as a "Y-axis direction". Furthermore, in the following description, a thickness direction of light guide member 1 (a direction in which first surface 11 and second surface 12 are arranged in FIG. 1A) is referred to as a "Z-axis direction". An X-axis, a Y-axis, and a Z-axis defining these directions are orthogonal to each other. Arrows indicating the "X-axis direction", the "Y-axis direction", and the "Z-axis direction" in the drawings are merely described for the sake of description, and are not accompanied by entities.

Furthermore, "extraction efficiency" referred to in the present disclosure refers to a ratio of the light amount of emission light rays emitted from second surface 12 (emission surface) of light guide member 1 to the light amount of second incident light rays LT2 incident on incident surface 10 of light guide member 1. That is, in a case where the relative ratio of the light amount of emission light rays emitted from second surface 12 of light guide member 1 to the light amount of second incident light rays LT2 incident on incident surface 10 of light guide member 1 increases, the light extraction efficiency increases (increases). As an example, in a case where the light amount of second incident light rays LT2 incident on incident surface 10 of light guide member 1 is "100", whereas the light amount of emission light rays emitted from second surface 12 of light guide member 1 is "10", the extraction efficiency of light in light guide member 1 is 10%.

Furthermore, the "optical axis" referred to in the present disclosure means a virtual light ray that is a representative of a pencil of light rays passing through the entire system. As an example, optical axis P1A of first incident light LT1A incident on light control body 2A from light source 4A coincides with a rotational symmetry axis of first incident light LT1A.

Furthermore, "parallel" referred to in the present disclosure means that an angle between two optical axes falls within a range of about several degrees (for example, less than two degrees) in addition to a case where two optical axes are substantially parallel, that is, two optical axes are strictly parallel.

Furthermore, "orthogonal" referred to in the present disclosure means that an angle between two optical axes falls within a range of about several degrees (for example, less than 2 degrees) with 90 degrees as a reference in addition to a case where two optical are substantially orthogonal, that is, two optical are strictly orthogonal.

(2.2) Display System

First, display system 300 will be described with reference to FIGS. 5 and 6.

Figure 5:
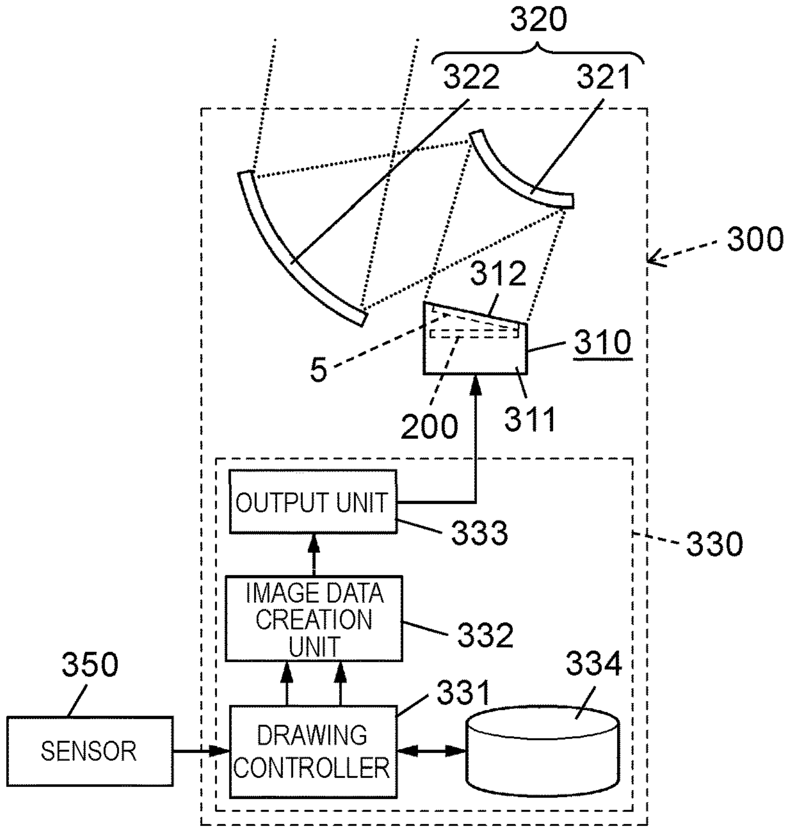
FIG. 5 is an explanatory diagram of a display system using the optical system.

As illustrated in FIG. 5, illumination system 200 according to the present exemplary embodiment constitutes display system 300 together with display 5. In other words, display system 300 according to the present exemplary embodiment includes illumination system 200 and display 5. Display 5 receives light emitted from illumination system 200 and displays an image. The "image" referred to herein is an image displayed in an aspect of being able to be visually recognized by user U1 (see FIG. 6), and may be a figure, a symbol, a character, a number, a pattern, a photograph, or the like, or a combination thereof. The image displayed on display system 300 includes a moving picture (moving image) and a still picture (still image). Further, the "moving picture" includes an image including a plurality of still pictures obtained by frame capturing or the like.

Figure 6:
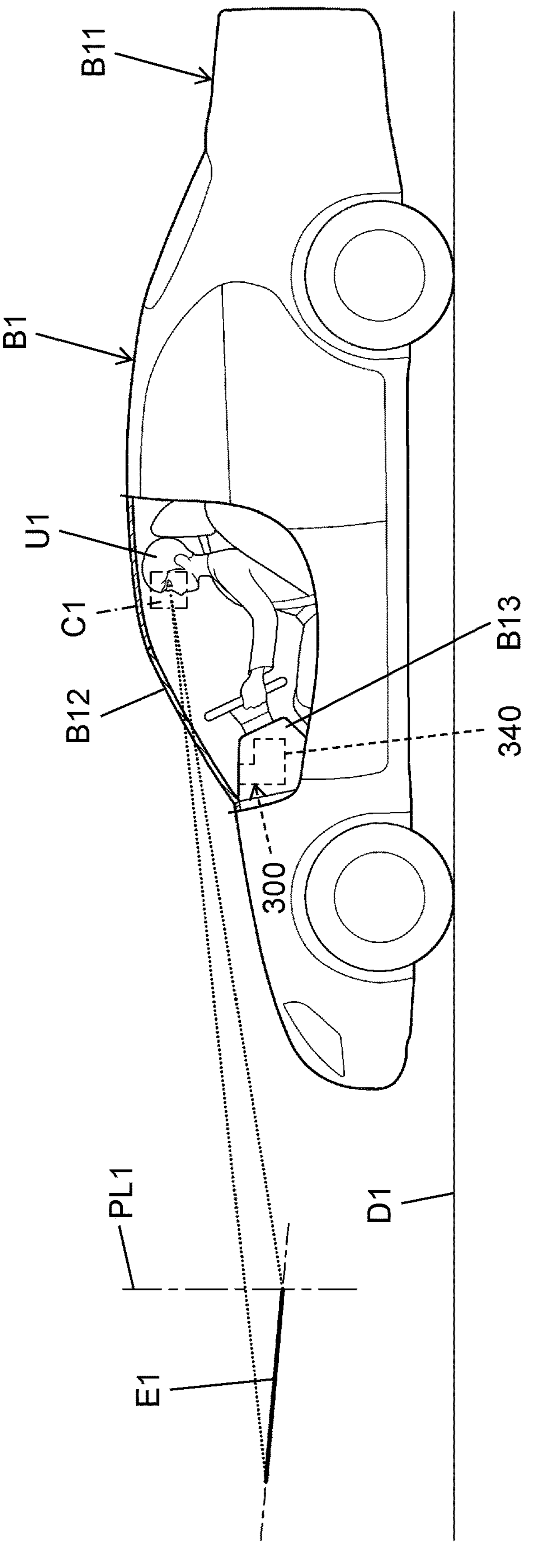
FIG. 6 is an explanatory diagram of a moving body including the display system.
Figure 7A:
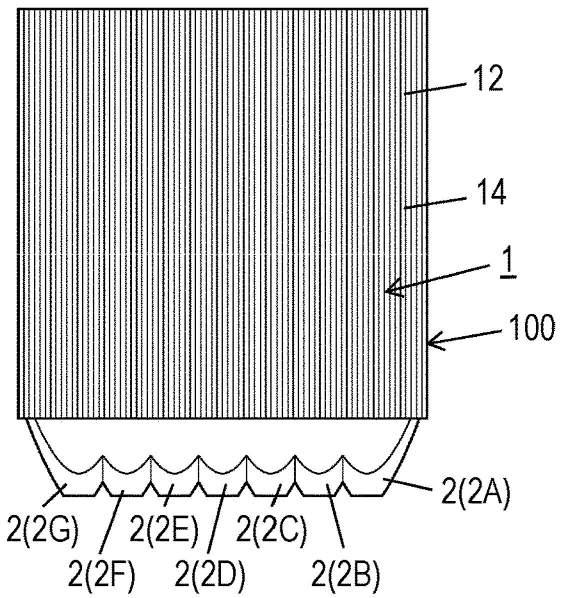
FIG. 7A is a plan view of the optical system.
Figure 7B:
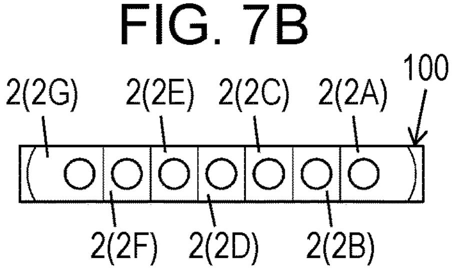
FIG. 7B is a front view of the optical system.
Figure 7D:
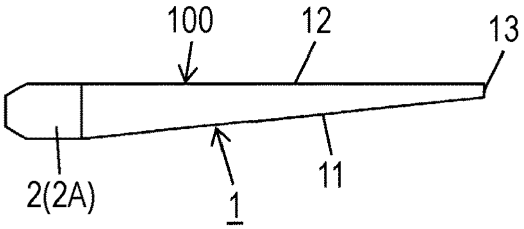
FIG. 7D is a side view of the optical system.
Figure 7C:
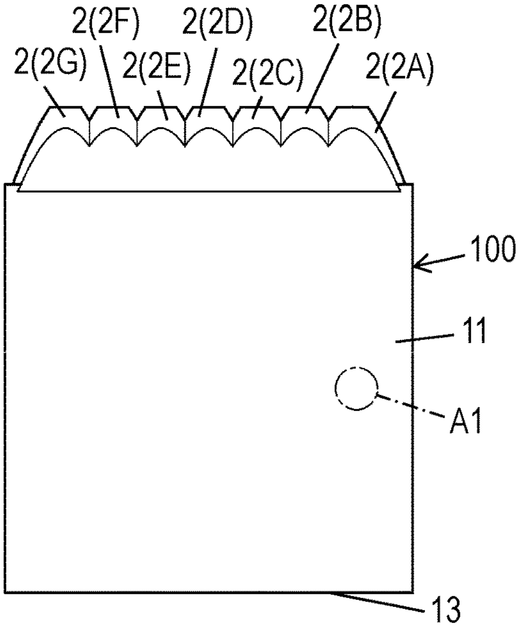
FIG. 7C is a bottom view of the optical system.

Furthermore, as illustrated in FIG. 6, display system 300 according to the present exemplary embodiment constitutes moving body B1 such as an automobile together with moving body main body B11. In other words, moving body B1 according to the present exemplary embodiment includes display system 300 and moving body main body B11. Moving body main body B11 includes display system 300 mounted thereon. In the present exemplary embodiment, as an example, moving body B1 is an automobile (passenger car) driven by a person. Note that, moving body B1 may be a self-driving car capable of traveling by self-driving. In this case, it is assumed that user U1 who visually recognizes the image displayed on display system 300 is an occupant of moving body B1, and a driver of the automobile as moving body B1 is user U1 as an example in the present exemplary embodiment.

In the present exemplary embodiment, display system 300 is used for, for example, a head-up display (HUD) mounted on moving body B1. Display system 300 is used, for example, to display driving assistance information related to speed information, condition information, driving information, and the like of moving body B1 in a field of view of user U1. The driving information of moving body B1 includes, for example, information related to navigation for displaying a traveling route and the like, and information related to adaptive cruise control (ACC) for maintaining a traveling speed and an inter-vehicle distance at constant values.

As illustrated in FIGS. 5 and 6, display system 300 includes image display unit 310, optics 320, and controller 330. Furthermore, display system 300 further includes housing 340 that accommodates image display unit 310, optics 320, and controller 330.

Housing 340 is made of, for example, a molded product of synthetic resin. Housing 340 accommodates image display unit 310, optics 320, controller 330, and the like. Housing 340 is attached to dashboard B13 of moving body main body B11. Light reflected by second mirror 322 (to be described later) of optics 320 is emitted to a reflecting member (windshield B12) through an opening of an upper surface of housing 340, and light reflected by windshield B12 is condensed on eye-box C1. The reflecting member is not limited to windshield B12, and may be implemented by, for example, a combiner disposed on dashboard B13 of moving body main body B11.

According to such a display system 300, user U1 visually recognizes a virtual image projected in a space in front of moving body B1 (outside a vehicle) through windshield B12. When light emitted from display system 300 is diverged by the reflecting member such as windshield B12, the "virtual image" referred to in the present disclosure means an image tied as if an object were actually present by a diverging light ray. Thus, user U1 who is driving moving body B1 visually recognizes the image as the virtual image projected by display system 300 in superposition with a real space spreading in front of moving body B1. In short, display system 300 according to the present exemplary embodiment displays the virtual image as the image. The image (virtual image) displayable by display system 300 includes virtual image E1 superimposed along traveling plane D1 of moving body B1 and a virtual image stereoscopically drawn along plane PL1 orthogonal to traveling plane D1.

Image display unit 310 includes case 311. Image display unit 310 has a function of displaying a stereoscopic image by a light field system that stereoscopically shows a target object by reproducing light emitted from the target object in the image in a plurality of directions. However, a system by which image display unit 310 stereoscopically displays a virtual image of the target object to be stereoscopically drawn is not limited to the light field system. Image display unit 310 may adopt a parallax system that causes user U1 to visually recognize the virtual image of the target object to be stereoscopically drawn by projecting images having parallaxes on left and right eyes of user U1.

Image display unit 310 includes display 5 and illumination system 200 including optical system 100. Display 5 is, for example, a liquid crystal display or the like, and displays an image by receiving light emitted from illumination system 200. That is, illumination system 200 emits light from the back of display 5 toward display 5. The light from illumination system 200 passes through display 5, and thus, display 5 displays an image. In other words, illumination system 200 functions as a backlight of display 5.

Image display unit 310 includes case 311. Case 311 houses illumination system 200 including optical system 100 and light source 4, and display 5. Illumination system 200 and display 5 are held by case 311. Here, display 5 is disposed along an upper surface of case 311, and one surface of display 5 is exposed from the upper surface of case 311. Illumination system 200 is disposed below display 5 in case 311, and outputs light from below display 5 toward display 5. Accordingly, the upper surface of case 311 constitutes display surface 312 on which an image is displayed.

Image display unit 310 is accommodated inside housing 340 in a state where display surface 312 faces first minor 321 (to be described later). Display surface 312 of image display unit 310 has a shape (for example, a rectangular shape) matching a range of an image to be projected onto user U1, that is, a shape of windshield B12. A plurality of pixels are disposed in an array shape on display surface 312 of image display unit 310. The plurality of pixels of image display unit 310 emit light in accordance with the control of controller 330, and an image is displayed on display surface 312 by light output from display surface 312 of image display unit 310.

The image displayed on display surface 312 of image display unit 310 is emitted to windshield B12, and the light reflected by windshield B12 is condensed on eye-box C1. That is, the image displayed on display surface 312 is visually recognized by user U1 whose viewpoint is in eye-box C1 through optics 320. At this time, user U1 visually recognizes the virtual image projected in the space in front of moving body B1 (outside the vehicle) through windshield B12.

Optics 320 condenses the light output from display surface 312 of image display unit 310 on eye-box C1. In the present exemplary embodiment, optics 320 includes, for example, first mirror 321 that is a convex minor, second minor 322 that is a concave mirror, and windshield B12.

First minor 321 reflects the light output from image display unit 310 and causes the light to be incident on second mirror 322. Second mirror 322 reflects the light incident from first minor 321 toward windshield B12. Windshield B12 reflects the light incident from second mirror 322 and causes the light to be incident on eye-box C1.

Controller 330 includes, for example, a computer system. The computer system mainly includes, as hardware, one or more processors and one or more memories. Functions (for example, functions of drawing controller 331, image data creation unit 332, output unit 333, and the like) of controller 330 are implemented by one or more processors executing programs recorded in one or more memories of the computer system or storage 334. The programs are recorded in advance in one or more memories of the computer system or storage 334. The programs may be provided through a telecommunication line, or may be provided by being recorded in a non-transitory recording medium such as a memory card, an optical disk, or a hard disk drive readable by the computer system.

storage 334 is implemented by, for example, a non-transitory recording medium such as a rewritable nonvolatile semiconductor memory. storage 334 stores programs and the like executed by controller 330. Furthermore, as described above, display system 300 is used to display the driving assistance information related to the speed information, the condition information, the driving information, and the like of moving body B1 in the field of view of user U1. Thus, the type of the virtual image displayed by display system 300 is determined in advance. In storage 334, image data for displaying a virtual image (virtual image E1 that is a target object to be drawn in a planar manner, and a virtual image that is an object to be stereoscopically drawn) is stored in advance.

Drawing controller 331 receives detection signals from various sensors 350 mounted on moving body B1. Sensors 350 are, for example, sensors for detecting various types of information used in an advanced driver assistance system (ADAS). Sensor 350 includes, for example, at least one of a sensor for detecting a state of moving body B1 and a sensor for detecting a state around moving body B1. The sensor for detecting the state of moving body B1 includes, for example, a sensor that measures a vehicle speed, a temperature, a remaining fuel, or the like of moving body B1. The sensor for detecting the state around moving body B1 includes an image sensor that captures an image around moving body B1, a millimeter wave radar, light detection and ranging (LiDAR), or the like.

Drawing controller 331 acquires one or a plurality of pieces of image data for displaying information regarding the detection signals from storage 334 based on the detection signal input from sensor 350. Here, in a case where a plurality of types of information are displayed on image display unit 310, drawing controller 331 acquires a plurality of pieces of image data for displaying a plurality of types of pieces of information. Furthermore, drawing controller 331 obtains positional information regarding a position at which a virtual image is displayed in a target space in which the virtual image is displayed based on the detection signals input from sensors 350. Drawing controller 331 outputs image data and positional information of a virtual image to be displayed to image data creation unit 332.

Image data creation unit 332 creates image data for displaying the virtual image to be displayed based on the image data and the positional information input from drawing controller 331.

Output unit 333 outputs the image data created by image data creation unit 332 to image display unit 310, and displays the image based on the created image data on display surface 312 of image display unit 310. The image displayed on display surface 312 is projected onto windshield B12, and thus, the image (virtual image) is displayed by display system 300. By doing this, the image (virtual image) displayed by display system 300 is visually recognized by user U1.

(2.3) Optical System

Next, optical system 100 will be described with reference to FIGS. 1A to 4 and FIGS. 7A to 10.

In the present exemplary embodiment, optical system 100 includes light guide member 1, a plurality of light control bodies 2 (light control body 2A to light control body 2G), and a plurality of prisms 3. That is, optical system 100 according to the present exemplary embodiment includes the plurality of light control bodies 2, and further includes the plurality of prisms 3.

Furthermore, in the present exemplary embodiment, optical system 100 constitutes illumination system 200 together with light source 4A to light source 4G. That is, illumination system 200 according to the present exemplary embodiment includes optical system 100 and light source 4A to light source 4G.

Since the plurality of light sources 4 (light source 4A to light source 4G) adopt a common configuration, the configuration described for one light source 4 is similar to the configurations of the other light sources 4 unless otherwise specified.

Light source 4 includes, for example, a solid-state light emitting element such as a light emitting diode (LED) element or an organic electro-luminescence (OEL) element. In the present exemplary embodiment, as an example, light source 4 is a light emitting diode element having a chip shape. Such a light source 4 actually emits light with a front surface (light emitting surface) having a certain area, but ideally can be regarded as a point light source that emits light from one point on the front surface. Therefore, in the following description, the description is made on the assumption that light source 4 is an ideal point light source.

In the present exemplary embodiment, as illustrated in FIG. 2, light source 4 is disposed to face incident surface 10 of light guide member 1 at a predetermined interval. Light control body 2 is positioned between light source 4 and incident surface 10 of light guide member 1.

In the present exemplary embodiment, light control body 2 is integrated with light guide member 1. In addition, "integrated" referred to in the present disclosure means an aspect in which a plurality of elements (portions) can be physically handled as one body. That is, the fact that the plurality of elements are integrated means an aspect in which the plurality of elements are integrated into one body and can be handled as one member. In this case, the plurality of elements may be in the integrally inseparable relationship as the integrally molded product, or a plurality of elements separately produced may be mechanically coupled by, for example, welding, adhesion, caulking, or the like. That is, light guide member 1 and light control body 2 may be integrated in an appropriate aspect.

More specifically, in the present exemplary embodiment, as described above, light guide member 1 and light control body 2 are integrated as the integrally molded product. That is, in the present exemplary embodiment, light guide member 1 and light control body 2 are formed as the integrally molded product and are in the integrally inseparable relationship. Thus, as described above, incident surface 10 of light guide member 1 is the "virtual surface" defined inside the integrally molded product of light guide member 1 and light control body 2, and is not accompanied by entity.

Figure 4:
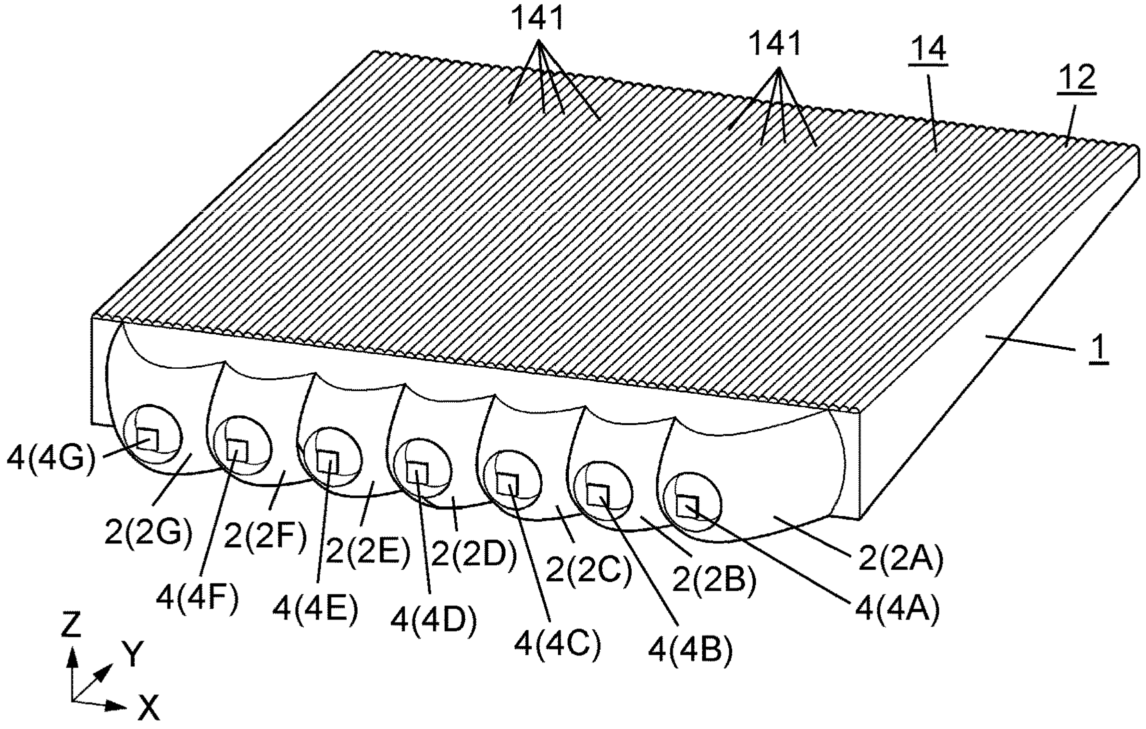
FIG. 4 is a perspective view illustrating an outline of the optical system.

Here, as illustrated in FIG. 4, light source 4A to light source 4G are disposed to be arranged at predetermined intervals in the X-axis direction. Light source 4A to light source 4G correspond to the plurality of light control body 2A to light control body 2G in a one-to-one correspondence. That is, similarly to light source 4A to light source 4G, light control body 2A to light control body 2G are disposed to be arranged in the X-axis direction. Here, a pitch between light source 4A to light source 4G in the X-axis direction is equal to a pitch between light control body 2A to light control body 2G.

Light guide member 1 is a member that takes in the light from light source 4 from incident surface 10 into light guide member 1, and guides, that is, optically guides the light to second surface 12 which is the emission surface through light guide member 1. In the present exemplary embodiment, as an example, light guide member 1 is a molded product made of a resin material having translucency such as an acrylic resin, and is formed in a plate shape. That is, light guide member 1 is a light guide plate having a certain thickness.

As described above, light guide member 1 includes incident surface 10 on which light is incident, and first surface 11 and second surface 12 (emission surface) facing each other. Further, light guide member 1 includes end surface 13 facing incident surface 10.

Specifically, in the present exemplary embodiment, as illustrated in FIGS. 7A to 7D, light guide member 1 has a rectangular plate shape, and two surfaces facing each other in the thickness direction of light guide member 1 are first surface 11 and second surface 12, respectively. Furthermore, one end surface of four end surfaces (peripheral surfaces) of light guide member 1 is incident surface 10. That is, light guide member 1 is formed in a square shape in plan view (as viewed from one side in the Z-axis direction). Here, as an example, light guide member 1 is formed in a rectangular shape having a smaller dimension in the Y-axis direction than in the X-axis direction. Both surfaces of light guide member 1 in the thickness direction (Z-axis direction) constitute first surface 11 and second surface 12, respectively. Further, both surfaces of light guide member 1 in a lateral direction (Y-axis direction) constitute incident surface 10 and end surface 13, respectively.

As described above, one end surface (left surface in FIG. 1A) of two end surfaces of light guide member 1 facing each other in the Y-axis direction is incident surface 10 on which first incident light rays LT1 (first incident light LT1A to first incident light LT1G) emitted from light source 4A to light source 4G are incident as second incident light rays LT2 (second incident light LT2A to second incident light LT2G) through light control body 2A to light control body 2G, respectively. Two surfaces of light guide member 1 facing each other in the Z-axis direction are first surface 11 and second surface 12, respectively. First surface 11 is a lower surface in FIG. 1A, and second surface 12 is an upper surface in FIG. 1A. Second surface 12 is an emission surface that emits emission light from the inside to the outside of light guide member 1. Accordingly, in light guide member 1, second incident light rays LT2 are incident from one end surface which is incident surface 10, second surface 12 which is the emission surface performs surface emission.

Furthermore, in the present exemplary embodiment, second surface 12 is a plane parallel to an X-Y plane. Furthermore, incident surface 10 is a plane parallel to an X-Z plane. The "X-Y plane" referred to herein is a plane including the X-axis and the Y-axis and orthogonal to the Z-axis. Similarly, the "X-Z plane" referred to herein is a plane including the X-axis and the Z-axis and orthogonal to the Y-axis. Since second surface 12 is a plane orthogonal to the Z-axis and incident surface 10 is a plane orthogonal to the Y-axis, second surface 12 and incident surface 10 are orthogonal to each other.

On the other hand, first surface 11 is not parallel to the X-Y plane but is a plane inclined with respect to the X-Y plane. That is, first surface 11 and incident surface 10 are not orthogonal to each other. Specifically, first surface 11 is inclined to be inclined with the X-Y plane, and becomes closer to second surface 12 as the first surface becomes distant from incident surface 10. That is, in the present exemplary embodiment, first surface 11 and second surface 12 are inclined to each other.

Furthermore, in the present exemplary embodiment, as illustrated in FIG. 1A, end surface 13 is, for example, parallel to incident surface 10.

Furthermore, in the present exemplary embodiment, light distribution controller 14 is provided on second surface 12. Light distribution controller 14 includes a lens. In the present exemplary embodiment, as an example, the light distribution controller includes a cylindrical lens. Light distribution controller 14 will be described in detail in the section of "(2.7) Light distribution controller". Note that, light distribution controller 14 is not an essential component of optical system 100, and can be omitted as appropriate.

Light control body 2 is disposed between light source 4 and incident surface 10 of light guide member 1. Light control body 2 controls light output from light source 4 and incident on incident surface 10. In the present exemplary embodiment, light control body 2 has a collimating function of bringing first incident light LT1 output from light source 4 close to parallel light. That is, in a case where first incident light LT1 radially spreading from light source 4 is incident, light control body 2 is a collimating lens that brings first incident light LT1 close to parallel light by condensing the first incident light toward incident surface 10. Here, first incident light LT1 emitted from light source 4 is incident on incident surface 10 of light guide member 1 through light control body 2. Thus, first incident light LT1 from light source 4 is controlled by light control body 2 having a collimating function to narrow a divergence angle, and is emitted as second incident light LT2 toward incident surface 10 of light guide member 1. In the present exemplary embodiment, it is assumed that first incident light LT1 from light source 4 as the ideal point light source is converted into second incident light LT2 which is ideal parallel light by light control body 2.

In the present exemplary embodiment, as illustrated in FIG. 4, a plurality of light control bodies 2 (light control body 2A to light control body 2G) are formed to be arranged in the X-axis direction at ends constituting incident surface 10 of light guide member 1. That is, in the present exemplary embodiment, light control body 2 is integrated with light guide member 1. Furthermore, as described above, light control body 2A to light control body 2G correspond to the plurality of light sources 4 (light source 4A to light source 4G) in a one-to-one correspondence. Accordingly, light control body 2A to light control body 2G control the divergence angles of first incident light rays LT1 (first incident light LT1A to first incident light LT1G) emitted from corresponding light sources 4, and second incident light rays LT2 (second incident light LT2A to second incident light LT2G) as parallel light rays are incident on incident surface 10. Furthermore, as described above, in the present exemplary embodiment, the directions of optical axes P2 (optical axis P2A to optical axis P2G) of second incident light LT2A to second incident light LT2G are different from each other.

In the present exemplary embodiment, the angles formed by optical axis P2A and optical axis P2B to optical axis P2G are preferably more than 0 degrees and is less than 15 degrees, and more preferably between 1 degree and 10 degrees (inclusive). Details of the function of light control body 2 will be described in the section of "(2.4) Light control body".

Prisms 3 are provided on first surface 11, and reflect light rays passing through an inside of light guide member 1 toward second surface 12. In the present exemplary embodiment, the plurality of prisms 3 are provided on first surface 11. Prisms 3 are configured to totally reflect incident second incident light rays LT2. Of course, prisms 3 are not limited to the aspect in which all incident second incident light rays LT2 are totally reflected, and may include an aspect in which a part of second incident light rays LT2 is not totally reflected, passes through an inside of prisms 3, and is emitted to the outside of light guide member 1.

In light guide member 1, most of second incident light rays LT2 incident from incident surface 10 is emitted from second surface 12 by not being reflected at a portion of first surface 11 or second surface 12 excluding prism 3 but being reflected by prism 3. That is, light guide member 1 includes direct optical path L1 along which second incident light rays LT2 incident from incident surface 10 are directly reflected by prisms 3 and the second incident light rays are emitted as the emission light rays from second surface 12.

In the present exemplary embodiment, prisms 3 are formed on first surface 11 such that a cross section viewed from one side in the X-axis direction is a concave portion having a triangular shape. Prisms 3 are formed by, for example, processing first surface 11 of light guide member 1. As illustrated in FIG. 1B, prism 3 has reflecting surface 30 that reflects second incident light LT2 incident through an inside of light guide member 1 toward second surface 12. FIG. 1B is an enlarged schematic end view of region F1 in FIG. 1A.

Angle (that is, an inclination angle of reflecting surface 30) θ1 formed by reflecting surface 30 and first surface 11 is an angle at which incident angle θ0 of second incident light LT2 incident on reflecting surface 30 is more than or equal to a critical angle. That is, reflecting surface 30 is inclined with respect to first surface 11 such that incident second incident light LT2 is totally reflected. Furthermore, in the present exemplary embodiment, inclination angle θ1 of reflecting surface 30 is set such that the light totally reflected by reflecting surface 30 is incident in a direction perpendicular to second surface 12, for example. In the present exemplary embodiment, the plurality of second incident light rays LT2 (second incident light LT2A to second incident light LT2G) are incident on first surface 11. Since the directions of optical axis P2A to optical axis P2G of second incident light LT2A to second incident light LT2G are different, inclination angle θ1 is different for each of the plurality of regions A0 (region A01 to region A07) in which second incident light LT2A to second incident light LT2G are incident on first surface 11. Note that, the direction in which the light rays totally reflected by reflecting surfaces 30 are incident on second surface 12 is not limited to the perpendicular direction, and the light rays totally reflected by reflecting surface 30 may be incident obliquely on second surface 12.

Figure 8A:
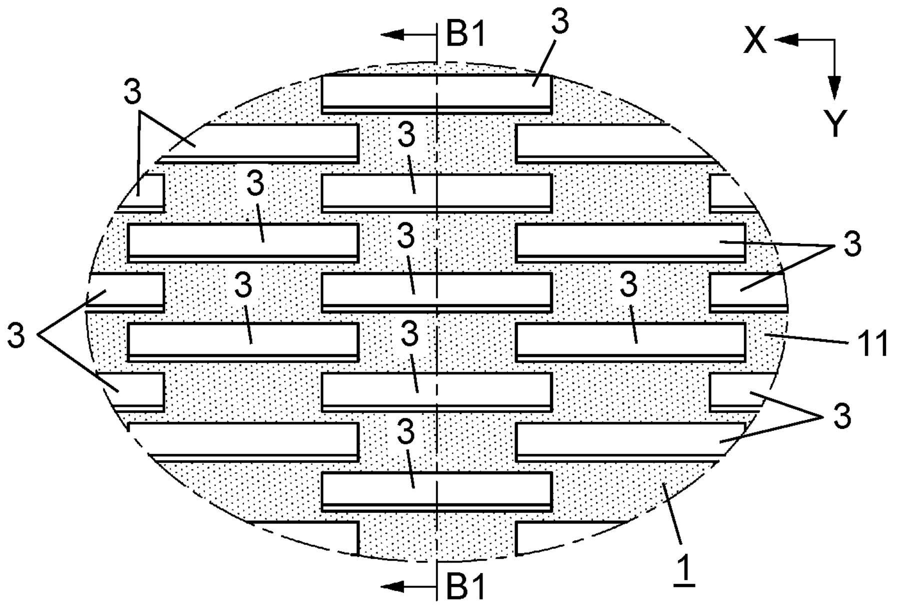
FIG. 8A is an enlarged schematic view of region A1 in FIG. 7C.
Figure 8B:
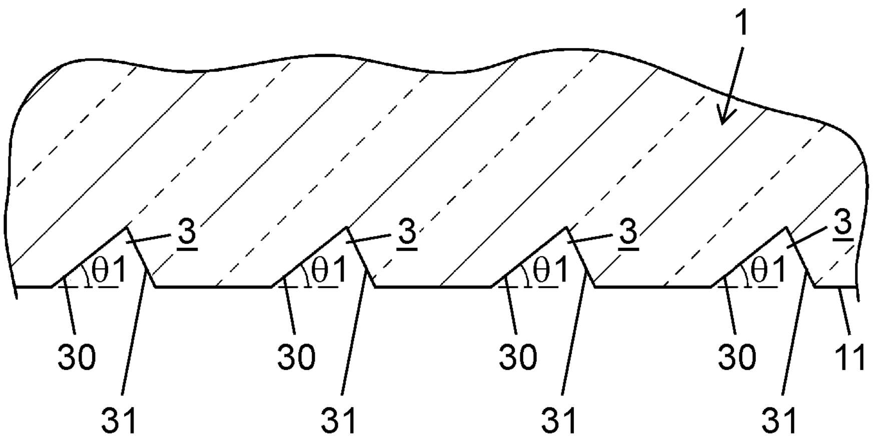
FIG. 8B is a cross-sectional view taken along line B1-B1 of FIG. 8A.

In the present exemplary embodiment, as illustrated in FIGS. 8A and 8B, the plurality of prisms 3 are disposed in a zigzag pattern on first surface 11 as viewed from one side in the Z-axis direction. Here, FIG. 8A is an enlarged schematic plan view of region A1 in FIG. 7C. Here, region A1 is a part of region A01 on which second incident light LT2A which is parallel light perpendicularly incident on incident surface 10 is incident. FIG. 8B is a diagram schematically illustrating an end surface taken along line B1-B1 in FIG. 8A. Although only a part of first surface 11 is illustrated in FIG. 8A, actually, the plurality of prisms 3 are formed over substantially the entire region of first surface 11.

Specifically, each prism 3 has a length in the X-axis direction, and a plurality of prisms 3 are formed to be arranged at intervals in a longitudinal direction (X-axis direction). Further, the plurality of prisms 3 are formed to be arranged at intervals also in the Y-axis direction. In a case where columns of the plurality of prisms arranged in the X axis direction are first, second, and third, . . . columns from incident surface 10 side in the Y axis direction, the plurality of prisms 3 included in even-numbered columns and the plurality of prisms 3 included in odd-numbered columns are positioned at positions shifted from each other in the X-axis direction. Here, in the present exemplary embodiment, the plurality of prisms 3 included in the even-numbered columns and the plurality of prisms 3 included in the odd-numbered columns are disposed such that ends in the longitudinal direction (X-axis direction) overlap each other, for example, in the Y-axis direction. According to such disposing, the plurality of prisms 3 are arranged without a gap in the X-axis direction as viewed from incident surface 10, and second incident light ray LT2 incident on the inside of light guide member 1 from incident surface 10 is reflected by any prism 3 among the plurality of prisms 3. Note that, the plurality of prisms 3 included in the even-numbered columns may be disposed such that ends in the longitudinal direction (X-axis direction) have different inclinations with respect to the Y-axis direction. Furthermore, the plurality of prisms 3 included in the odd-numbered columns may be disposed such that ends in the longitudinal direction (X-axis direction) have different inclinations with respect to the Y-axis direction.

In the present exemplary embodiment, as an example, all the plurality of prisms 3 have the identical shape. Thus, as illustrated in FIG. 8B, in the plurality of prisms 3 arranged in the Y-axis direction, inclination angles θ1 of reflecting surfaces 30 are the identical angle. Furthermore, sizes of prisms 3, such as dimensions of prisms 3 in the longitudinal direction and depths of the concave portions as prisms 3 (in other words, heights of prisms 3) are identical in the plurality of prisms 3. That is, in the present exemplary embodiment, the plurality of prisms 3 are arranged in the Y-axis direction. Here, in each of region A01 to region A07, the plurality of prisms 3 have the identical shape. Thus, in a case where incident angles θ0 of second incident light rays LT2 incident on reflecting surface 30 in same region A0 are constant, directions of second incident light rays LT2 reflected by reflecting surfaces 30 of prisms 3 are identical even in a case where the light is incident on any prism 3 among the plurality of prisms 3. Accordingly, all second incident light rays LT2 reflected by the plurality of prisms 3 in same region A0 can be incident in a direction perpendicular to second surface 12.

Further, as an example, the depth (In other words, the height of prism 3) of the concave portion as prism 3 is between 1 μm and 100 μm (inclusive). Similarly, as an example, a pitch between the plurality of prisms 3 in the Y-axis direction is between 1 μm and 1000 μm (inclusive). As a specific example, the depth of the concave portion as prism 3 in region A01 is more than ten 1 μm, and the pitch between the plurality of prisms 3 in the Y-axis direction is more than one hundred 1 μm.

Hereinafter, a light emission principle of optical system 100 of the present exemplary embodiment will be described with reference to FIGS. 1A, 3A, and 3B.

As illustrated in FIG. 1A, for example, the divergence angle of first incident light LT1A emitted from light source 4A is controlled by passing through light control body 2A. Second incident light LT2A whose divergence angle is controlled is emitted from light control body 2A toward incident surface 10 of light guide member 1. In the present exemplary embodiment, second incident light LT2A emitted from light control body 2A becomes parallel light parallel to second surface 12 and is perpendicularly incident on incident surface 10.

Subsequently, as illustrated in FIG. 1B, most of second incident light LT2A incident on incident surface 10 is not reflected by first surface 11 and second surface 12, but is totally reflected by reflecting surface 30 of any prism 3 among the plurality of prisms 3 provided on first surface 11. That is, light guide member 1 includes direct optical path L1 along which second incident light LT2A incident from incident surface 10 is directly reflected by prism 3 and the second incident light is emitted from second surface 12. Further, in the present exemplary embodiment, direct optical path L1 includes an optical path of second incident light LT2A totally reflected by prism 3. Second incident light LT2A totally reflected by reflecting surface 30 of prism 3 is along an optical path orthogonal to second surface 12 and is emitted from second surface 12.

Similarly, as illustrated in FIGS. 3A and 3B, first incident light LT1B to first incident light LT1G respectively emitted from light source 4B to light source 4G are incident, as second incident light LT2B to second incident light LT2G which are parallel light rays by passing through light control body 2B to light control body 2G, on incident surface 10. Here, second incident light LT2B to second incident light LT2G become parallel light rays intersecting second incident light LT2A. Furthermore, second incident light LT2B to second incident light LT2G become parallel light intersecting each other. That is, the directions of optical axis P2A to optical axis P2G of second incident light LT2A to second incident light LT2G are different from each other. Note that, the directions of optical axis P2A to optical axis P2G are not limited to different states, and in a case where the directions of at least two optical axes P2 among optical axis P2A to optical axis P2G are different from each other, there may be optical axes P2 whose directions are the same among optical axis P2A to optical axis P2G.

As illustrated in FIG. 3B, second incident light LT2B to second incident light LT2G totally reflected by reflecting surface 30 of any prism 3 among the plurality of prisms 3 provided on first surface 11 are along the optical path orthogonal to second surface 12, and are emitted from second surface 12.

In the present exemplary embodiment, since the plurality of prisms 3 are disposed over the entire region of first surface 11, second incident light LT2A to second incident light LT2G are emitted as the emission light rays from second surface 12 of light guide member 1 through direct optical path L1 as described above. Accordingly, second surface 12 performs surface emission, and the emission light becomes planar light. In the present exemplary embodiment, since the directions of optical axis P2A to optical axis P2G are different from each other, the luminance distribution of second incident light rays LT2 incident on first surface 11 becomes non-uniform. Since second incident light LT2 incident on first surface 11 is along direct optical path L1 and is emitted perpendicularly to second surface 12, the luminance distribution of the emission light rays on second surface 12 becomes non-uniform. That is, the directions of optical axis P2A to optical axis P2G of second incident light LT2A to second incident light LT2G are controlled by light control body 2A to light control body 2G, and thus, the emission light rays having a desired luminance distribution on second surface 12 can be obtained.

Hereinafter, advantages of optical system 100 of the present exemplary embodiment including light control body 2A to light control body 2G will be described with reference to FIGS. 3A to 3B and FIGS. 9 to 10.

Figure 9:
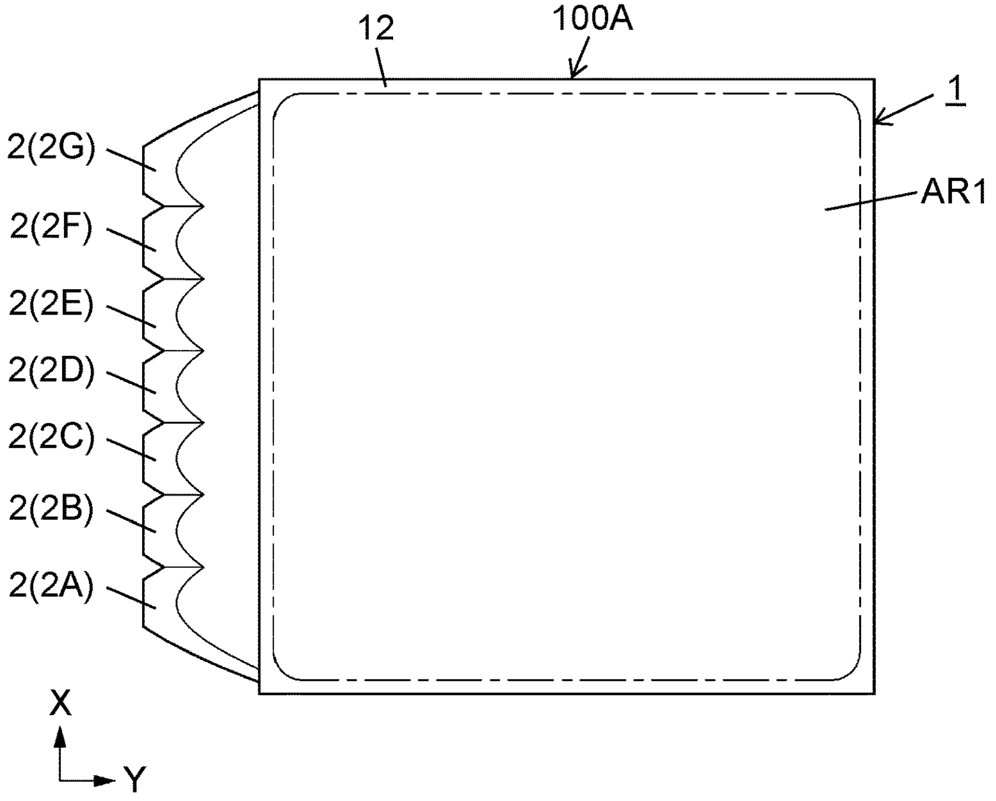
FIG. 9 is a plan view schematically illustrating a luminance distribution of emission light rays in an optical system of a comparative example.

Directions of optical axes P2 of a plurality of second incident light rays LT2 incident on incident surface 10 from a plurality of light control bodies (hereinafter, referred to as a plurality of light control bodies of a comparative example) included in a general optical system (hereinafter, referred to as optical system 100A of the comparative example) are equal to each other. FIG. 9 illustrates a luminance distribution of emission light rays in optical system 100A of the comparative example. In optical system 100A of the comparative example, the plurality of second incident light rays LT2 incident on incident surface 10 from the plurality of light control bodies are parallel light rays parallel to each other and are perpendicularly incident on incident surface 10. In this case, the luminance distribution of second incident light rays LT2 incident on first surface 11 from incident surface 10 becomes uniform. Since second incident light rays LT2 incident on first surface 11 are along direct optical path L1 and are emitted perpendicularly to second surface 12, luminance distribution AR1 of the emission light rays on second surface 12 becomes uniform as illustrated in FIG. 9. Note that, luminance distribution AR1 illustrated in FIGS. 9 and 10 and luminance distribution AR2 to be described later schematically illustrate the luminance distribution of the emission light rays on second surface 12. Here, luminance distribution AR1 and luminance distribution AR2 indicate portions where the light amount of emission light rays is relatively more than that outside ranges of luminance distribution AR1 and luminance distribution AR2.

In a case where optical system 100 including the plurality of light control bodies 2 is applied to a head-up display mounted on moving body B1 as in display system 300 according to the present exemplary embodiment, the plurality of light control bodies 2 are required to non-uniformly control the luminance distribution of the emission light rays on second surface 12 for the following reasons.

Display surface 312 of image display unit 310 of the head-up display receives the emission light rays emitted from second surface 12 through light distribution controller 14 to be described later and displays an image. Display surface 312 has a shape (for example, a rectangular shape) matching a range of an image to be projected onto user U1, that is, a shape of windshield B12. Second surface 12 is also provided in a shape corresponding to display surface 312.

Here, the image displayed on display surface 312 has a portion where the luminance distribution changes before being reflected by windshield B12 and visually recognized by user U1. Consequently, it is necessary to give in advance a luminance distribution that provides an optimum image when user U1 visually recognizes the emission light functioning as the backlight of display surface 312.

For example, in the present exemplary embodiment, in the image displayed on rectangular display surface 312, the intensity of the light on the upper left of windshield B12 as viewed from user U1 decreases until user U1 visually recognizes the image. This is because a length of the optical path between display surface 312 and eye-box C1 of user U1 becomes longer in the upper left region of windshield B12, and light is strongly scattered.

Figure 10:
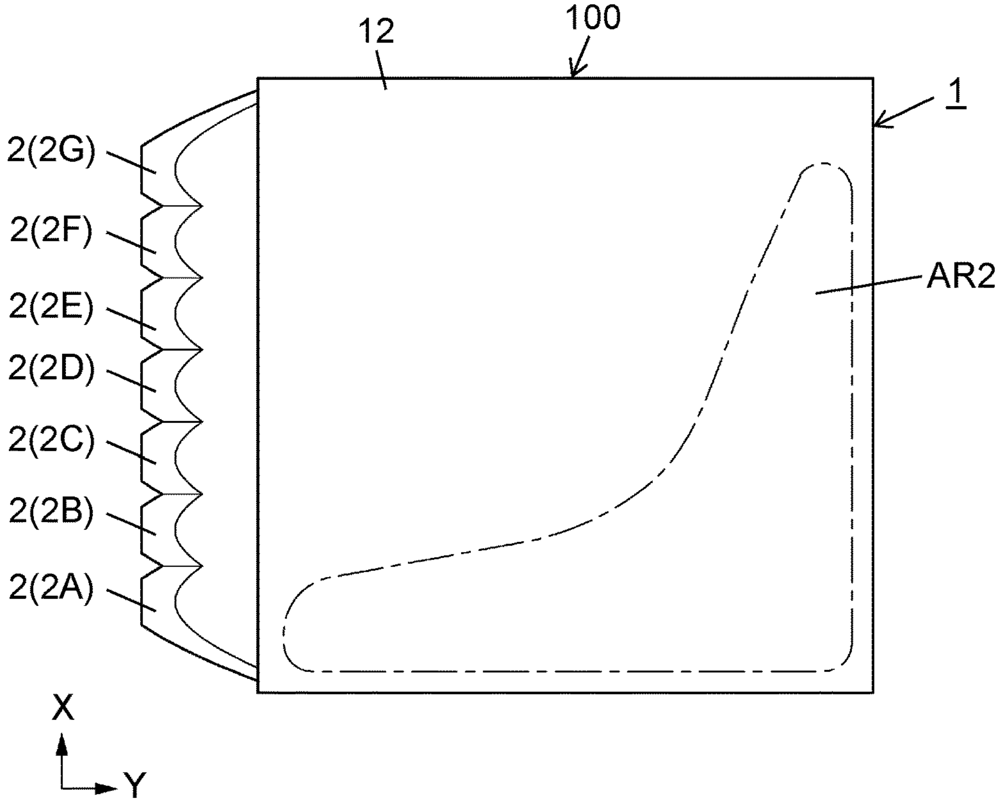
FIG. 10 is a plan view schematically illustrating a luminance distribution of emission light rays in the optical system of the exemplary embodiment.

Consequently, in the present exemplary embodiment, the directions of optical axis P2A to optical axis P2G are controlled by light control body 2A to light control body 2G, and thus, luminance distribution AR2 of the emission light rays emitted from the emission surface (second surface 12) on second surface 12 is controlled such that the lower right is relatively bright and the upper left is relatively dark as illustrated in FIG. 10. Note that, in the present exemplary embodiment, an up-and-down direction of windshield B12 as viewed from user U1 corresponds to an upside-down direction of the X-axis direction in FIGS. 9 and 10, and a left-and-right direction of windshield B12 as viewed from user U1 corresponds to a left-right reversal direction of the Y-axis direction. Thus, luminance distribution AR2 on second surface 12 is controlled such that the lower right is relatively bright and the upper left is dark, and thus, it is possible to allow user U1 to visually recognize an image with uniform brightness by correcting a decrease in the intensity of the light on the upper left of windshield B12.

In the present exemplary embodiment, in order to obtain luminance distribution AR2 as illustrated in FIG. 10, for example, as illustrated in FIG. 3A, the directions of optical axis P2A to optical axis P2G are controlled such that the inclinations of optical axis P2B to optical axis P2G with respect to optical axis P2A increase along the X-axis direction from light source 4A side to light source 4G side. Furthermore, for example, as illustrated in FIG. 3B, the directions of optical axis P2A to optical axis P2G are controlled such that the inclinations of optical axis P2B to optical axis P2F with respect to optical axis P2A are equal as viewed from the X-axis direction, and the inclination of optical axis P2G with respect to optical axis P2A is more than the inclinations of optical axis P2B to optical axis P2F with respect to optical axis P2A. Note that, the directions of optical axis P2A to optical axis P2G can be appropriately changed in accordance with desired luminance distribution AR2.

(2.4) Light Control Body

Next, the shape and the function of light control body 2 according to the present exemplary embodiment will be described in detail with reference to FIGS. 2 and 11 to 13.

Light control body 2 includes incident lens 21. Furthermore, in the present exemplary embodiment, each of incident lenses 21 included in light control body 2B to light control body 2G includes, for example, a plurality of lens units 22 having different lens characteristics such as a curvature distribution on the lens. Accordingly, light control body 2B to light control body 2G can change the directions of optical axes P2 from the directions of optical axes P1.

In incident lens 21 which is provided in light control body 2A and in which the curvature distribution on the lens is rotationally symmetric with respect to a central axis of the lens, for example, in a case where first incident light LT1 having optical axis P1 coincident with normal line L21 of main incident surface 211 is incident, the direction of optical axis P2 of second incident light LT2 is the same direction as the direction of optical axis P1. Note that, in a case where the direction of optical axis P2 can be controlled to be the same as the direction of optical axis P1, incident lens 21 included in light control body 2A may not be rotationally symmetric with respect to the central axis of the lens.

On the other hand, each of light control body 2B to light control body 2G can cause second incident light LT2 which is parallel light having optical axis P2 different from the direction of optical axis P1 to be incident on incident surface 10 by causing the plurality of lens units 22 to have different curvature distributions.

Figure 11:
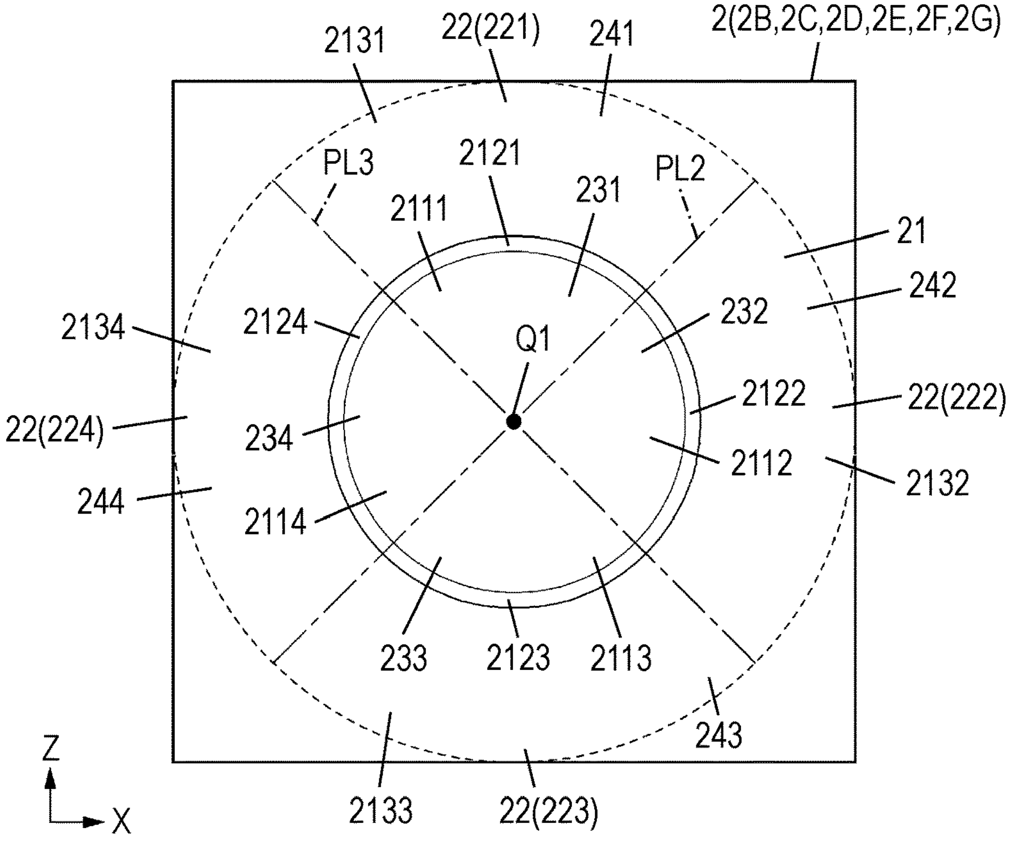
FIG. 11 is a front view illustrating an outline of a light control body of the optical system.

As illustrated in FIG. 11, in the present exemplary embodiment, for example, each of incident lenses 21 included in light control body 2B to light control body 2G includes four lens units 22 (first lens unit 221 to fourth lens unit 224). Light control body 2B to light control body 2G cause first incident light rays LT1 incident on first lens unit 221 to fourth lens unit 224 from light source 4 to be incident on incident surface 10.

Here, areas of first lens unit 221 to fourth lens unit 224 are equal as viewed from the direction of optical axis P1 of first incident light LT1. Furthermore, each of first lens unit 221 to fourth lens unit 224 is provided in a fan shape spreading in an outer peripheral direction around point Q1 where incident lens 21 intersects optical axis P1. First lens unit 221 and third lens unit 223 installed to face each other in a radial direction of a circle with point Q1 as a center are, for example, point-symmetric with respect to point Q1 as viewed from the direction of optical axis P1. Furthermore, second lens unit 222 and fourth lens unit 224 installed to face each other in the radial direction of the circle with point Q1 as the center are, for example, point-symmetric with respect to point Q1 as viewed from the direction of optical axis P1. In other words, incident lens 21 is equally divided into first lens unit 221 to fourth lens unit 224 by a plurality of (two in the present exemplary embodiment) planes PL2 and PL3 intersecting each other. Note that, in the present exemplary embodiment, a straight line formed by two intersecting planes PL2 and PL3 coincides with optical axis P1. Furthermore, in a case where the areas viewed from the direction of optical axis P1 are equal, first lens unit 221 and third lens unit 223 may not be point-symmetric with respect to point Q1. Furthermore, in a case where the areas viewed from the direction of optical axis P1 are equal, second lens unit 222 and fourth lens unit 224 may not be point-symmetric with respect to point Q1.

Furthermore, first lens unit 221 to fourth lens unit 224 are smoothly continuous. That is, a curvature of incident lens 21 is more than 0 on a boundary of each of first lens unit 221 to fourth lens unit 224.

As illustrated in FIG. 2, incident lens 21 includes refraction lens 23 and reflection lens 24. In the present exemplary embodiment, refraction lens 23 is formed to have a circular shape as viewed from the direction of optical axis P1. Furthermore, reflection lens 24 is formed in an annular shape surrounding the entire outer periphery of circular refraction lens 23.

Refraction lens 23 has main incident surface 211. Main incident surface 211 is disposed to face light sources 4, and at least a part of first incident light LT1 from light sources 4 is incident on refraction lens 23 from main incident surface 211. Here, since first incident light rays LT1 are light rays radially spreading from light sources 4, at least a part of first incident light LT1 incident on refraction lens 23 is refracted by main incident surface 211 in accordance with the incident angle of the light ray with respect to main incident surface 211. At least a part of first incident light LT1 refracted by main incident surface 211 is incident, as at least a part of second incident light LT2 that is parallel light, on incident surface 10.

Reflection lens 24 includes sub-incident surface 212 and outer peripheral surface 213.

Sub-incident surface 212 is directed to normal line L21 of main incident surface 211. Furthermore, in the present exemplary embodiment, sub-incident surface 212 is provided in an annular shape surrounding a region around main incident surface 211. Note that, sub-incident surface 212 is not limited to the annular shape surrounding region around main incident surface 211, and may be positioned at least at a part of the periphery of main incident surface 211. Furthermore, sub-incident surface 212 may be parallel (that is, not inclined) or inclined with respect to normal line L21 of main incident surface 211.

Outer peripheral surface 213 is positioned on a side opposite to normal line L21 of main incident surface 211 as viewed from sub-incident surface 212.

At least a part of first incident light LT1 is incident on reflection lens 24 from sub-incident surface 212. At least a part of first incident light LT1 incident on reflection lens 24 is refracted by sub-incident surface 212 in accordance with the incident angle of the light ray with respect to sub-incident surface 212. At least a part of first incident light LT1 refracted by sub-incident surface 212 is totally reflected by outer peripheral surface 213 and is incident, as at least a part of second incident light LT2, on incident surface 10.

Figure 12:
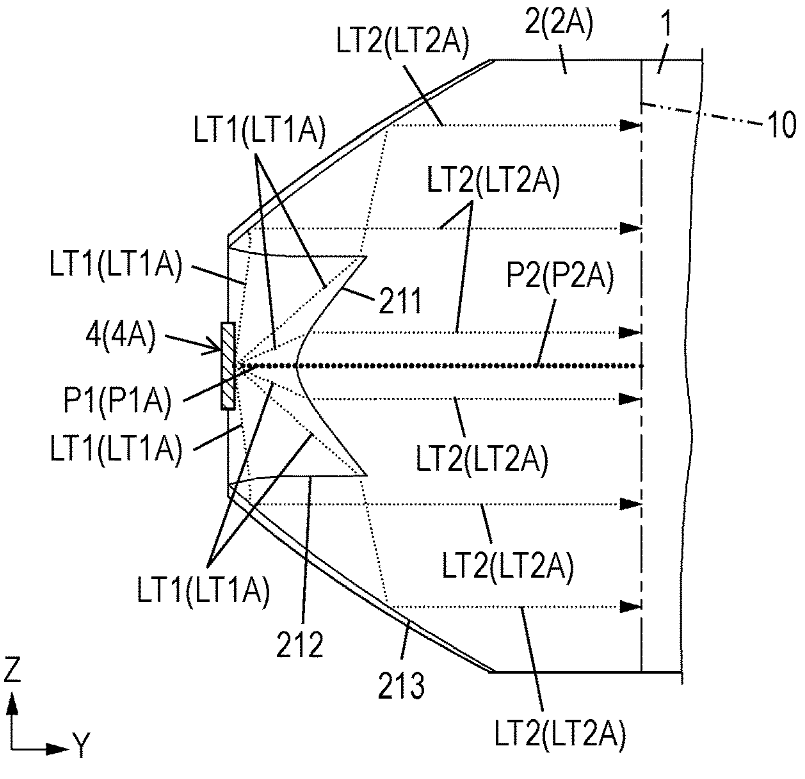
FIG. 12 is a side cross-sectional view for describing the optical path in the light control body of the optical system.

For example, as illustrated in FIG. 12, in the case of light control body 2A that controls first incident light LT1 such that optical axis P2 is on optical axis P1, at least a part of first incident light LT1A refracted by main incident surface 211 is perpendicularly incident, as at least a part of second incident light LT2A that is parallel light, on incident surface 10. Furthermore, at least a part of first incident light LT1A refracted by sub-incident surface 212 is totally reflected by outer peripheral surface 213 and is perpendicularly incident, as at least a part of second incident light LT2A, on incident surface 10.

Figure 13:
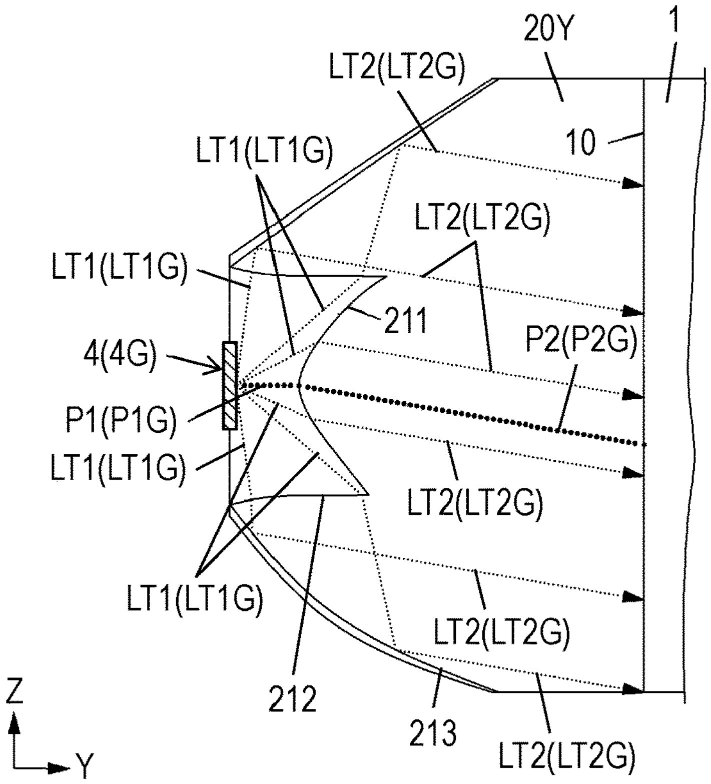
FIG. 13 is a side cross-sectional view for describing the optical path in the light control body of the optical system.

Furthermore, for example, as illustrated in FIG. 13, in the case of light control body 2G that controls first incident light LT1 such that optical axis P1 and optical axis P2 intersect (form an angle of 0 degrees or more), for example, at least a part of first incident light LT1G refracted by main incident surface 211 is obliquely incident, as at least a part of second incident light LT2G that is parallel light, on incident surface 10. Furthermore, at least a part of first incident light LT1G refracted by sub-incident surface 212 is totally reflected by outer peripheral surface 213 and is obliquely incident, as at least a part of second incident light LT2G, on incident surface 10. Here, at least a part of first incident light LT1G is refracted, for example, in the same direction regardless of the position on main incident surface 211 of light control body 2G. Furthermore, at least a part of first incident light LT1G is reflected, for example, in the same direction regardless of the position on outer peripheral surface 213. Furthermore, a direction in which at least a part of first incident light LT1G is refracted by main incident surface 211 and a direction in which first incident light LT1G is reflected by outer peripheral portion 213 are, for example, the same direction. Note that, lens unit 21 may be set such that at least a part of first incident light LT1G is refracted in different directions depending on the position on main incident surface 211, or may be set such that at least a part of first incident light LT1G is reflected in different directions depending on the position on outer peripheral surface 213. Furthermore, lens unit 21 may be set such that the direction in which at least a part of first incident light LT1G is refracted by main incident surface 211 is different from the direction in which the first incident light is reflected by outer peripheral portion 213.

Here, as described above, each of incident lenses 21 included in light control bodies 2B to 2G includes first lens unit 221 to fourth lens unit 224. Furthermore, as described above, incident lens 21 includes refraction lens 23 and reflection lens 24 (see FIG. 2). Refraction lens 23 is formed to have, for example, a circular shape as viewed from the direction of optical axis P1. Furthermore, reflection lens 24 is formed in, for example, an annular shape surrounding the entire outer periphery of circular refraction lens 23. Consequently, as illustrated in FIG. 11, first lens unit 221 to fourth lens unit 224 include, for example, refraction lens units (first refraction lens unit 231 to fourth refraction lens unit 234) that are parts of circular refraction lens 23, and reflection lens units (first reflection lens unit 241 to fourth reflection lens unit 244) that are parts of, for example, annular reflection lens 24 surrounding the outer periphery of refraction lens 23, respectively. Furthermore, first refraction lens unit 231 to fourth refraction lens unit 234 include first main incident surface 2111 to fourth main incident surface 2114 which are parts of main incident surface 211, respectively. First reflection lens unit 241 to fourth reflection lens unit 244 include first sub-incident surface 2121 to fourth sub-incident surface 2124 which are parts of sub-incident surface 212, and first outer peripheral surface 2131 to fourth outer peripheral surface 2134 which are parts of outer peripheral surface 213, respectively.

At least parts of first incident light rays LT1 incident on first refraction lens unit 231 to fourth refraction lens unit 234 from first main incident surface 2111 to fourth main incident surface 2114 are refracted by first main incident surface 2111 to fourth main incident surface 2114, respectively. At least parts of first incident light rays LT1 refracted by first main incident surface 2111 to fourth main incident surface 2114 are incident, as at least parts of second incident light rays LT2 that are parallel light rays, on incident surface 10.

Furthermore, at least parts of first incident light LT1 incident on first reflection lens unit 241 to fourth reflection lens unit 244 from first sub-incident surface 2121 to fourth sub-incident surface 2124 are refracted by first sub-incident surface 2121 to fourth sub-incident surface 2124, respectively. At least parts of first incident light rays LT1 refracted by first sub-incident surface 2121 to fourth sub-incident surface 2124 are totally reflected by first outer peripheral surface 2131 to fourth outer peripheral surface 2134, and are incident, as at least parts of second incident light rays LT2, on incident surface 10.

That is, at least parts of first incident light rays LT1 incident on first lens unit 221 to fourth lens unit 224 become second incident light LT21 to second incident light LT24 which are at least parts of second incident light rays LT2, and are incident on incident surface 10 from first lens unit 221 to fourth lens unit 224.

Here, each of second incident light LT21 to second incident light LT24 is, for example, parallel light. Furthermore, the optical axes of second incident light LT21 to second incident light LT24 are, for example, parallel to each other. That is, second incident light rays LT2 incident on incident surface 10 by light control body 2B to light control body 2G include, for example, second incident light LT21 to second incident light LT24 parallel to each other.

(2.5) Light Distribution Controller

Next, light distribution controller 14 will be described in detail with reference to FIG. 4.

In the present exemplary embodiment, at least one of first surface 11 and second surface 12 includes light distribution controller 14. Light distribution controller 14 controls the light distribution of the emission light rays extracted from second surface 12, which is the emission surface. Note that, the "light distribution of the emission light rays" referred to herein means the spreading of the emission light rays. In the present exemplary embodiment, as an example, light distribution controller 14 is provided on second surface 12. Further, in the present exemplary embodiment, light distribution controller 14 is integrated with light guide member 1 as the integrally molded product. That is, in the present exemplary embodiment, light guide member 1 and light distribution controller 14 are formed as the integrally molded product and are in the integrally inseparable relationship.

In short, in the present exemplary embodiment, light guide member 1 includes direct optical path L1 along which second incident light LT2 incident on light guide member 1 from incident surface 10 are emitted from second surface 12 only by one-time reflection at prisms 3 inside light guide member 1. Thus, the shapes of first surface 11 and second surface 12 do not contribute to the light guide of second incident light rays LT2 inside light guide member 1, and even though light distribution controller 14 is provided on first surface 11 or second surface 12, light guide performance in light guide member 1 is less likely to deteriorate.

Specifically, light distribution controller 14 in the present exemplary embodiment includes a lens. That is, light distribution controller 14 has a function of a lens as an optical element for refracting and diverging or converging light. Accordingly, light distribution controller 14 can control the light distribution by refracting and diverging or converging the emission light rays extracted from second surface 12, which is the emission surface.

More specifically, light distribution controller 14 includes a multi-lens including a group of a plurality of small lenses 141. In the present exemplary embodiment, each of the plurality of small lenses 141 is formed in a semi-cylindrical shape. The plurality of small lenses 141 are disposed to be arranged in the X-axis direction. Here, the plurality of small lenses 141 are formed without any gap over the entire region of second surface 12. The multi-lens including the group of the plurality of small lenses 141 having such a shape constitutes a so-called cylindrical lens.

For example, in the present exemplary embodiment, light distribution controller 14 controls the light distribution of the emission light rays such that the emission light rays are projected at an appropriate size on display surface 312 of image display unit 310 while a relative luminance distribution of the emission light rays on second surface 12 is maintained.

(3) Modifications

Hereinafter, modifications of the above exemplary embodiment will be described. However, components common to the components in the above exemplary embodiment are denoted by the same reference marks, and the description thereof is appropriately omitted. Furthermore, each configuration of the modifications to be described below can be applied by being appropriately combined with each configuration described in the above exemplary embodiment.

(3.1) Modification 1

Figure 14:
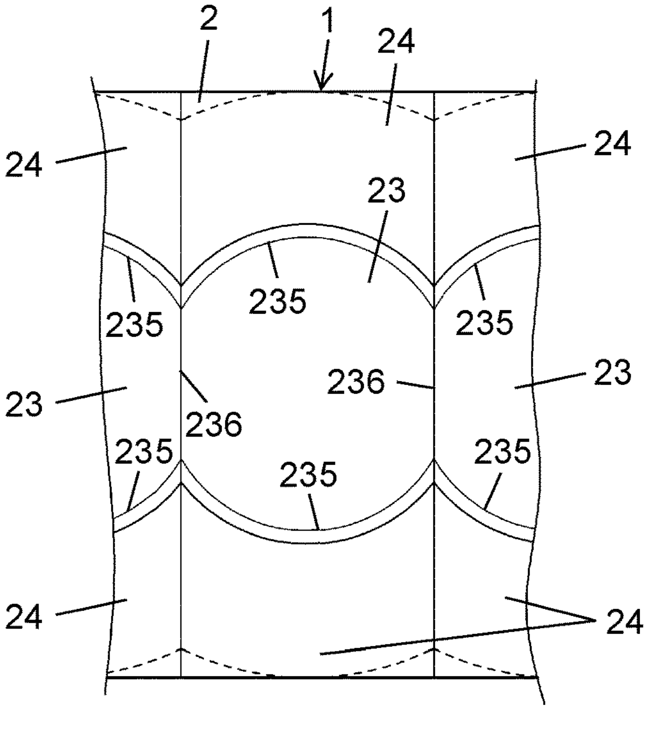
FIG. 14 is a front view illustrating an outline of a light control body according to Modification 1.

In optical system 100 of the above exemplary embodiment, refraction lens 23 is formed to have a circular shape as viewed from the direction of optical axis P1. Furthermore, reflection lens 24 is formed to surround the entire outer periphery of circular refraction lens 23. On the other hand, as illustrated in FIG. 14, optical system 100 of Modification 1 is different from the above exemplary embodiment in that refraction lens 23 is formed to have a circular shape of which a part is missed (missed circular shape) as viewed from the direction of optical axis P1. Refraction lens 23 of Modification 1 includes arc portion 235 and chord portion 236 on the outer periphery of the missed circle, and reflection lens 24 is formed along arc portion 235 of refraction lens 23.

In this case, among refraction lens 23A to refraction lens 23G included in light control body 2A to light control body 2G, refraction lenses 23 adjacent to each other in the X-axis direction have common chord portion 236 and are continuous at common chord portion 236.

(3.2) Modification 2

In optical system 100 of the above exemplary embodiment, the optical axes of second incident light LT21 to second incident light LT24 are parallel to each other. On the other hand, optical system 100 of Modification 2 is different from the above exemplary embodiment in that directions of at least two optical axes of the optical axes of second incident light LT21 to second incident light LT24 are different from each other. In other words, light control body 2 of Modification 2 can separately control the emission directions of second incident light LT21 to second incident light LT24 which are parallel light rays. Accordingly, the luminance distribution of the emission light rays on second surface 12 can be more finely controlled as compared with a case where the emission direction of second incident light LT2 is controlled for each of the plurality of light control bodies 2 in the above exemplary embodiment.

(3.3) Other Modifications

First refraction lens unit 231 to fourth refraction lens unit 234 and first reflection lens unit 241 to fourth reflection lens unit 244 may separately control the refraction directions of first incident light rays LT1 incident on the lens units, and the refraction directions of first incident light rays LT1 incident on first refraction lens unit 231 to fourth refraction lens unit 234 and first reflection lens unit 241 to fourth reflection lens unit 244 may not be the same.

First surface 11 may be a surface orthogonal to incident surface 10, and second surface 12 may be a surface inclined with respect to the X-Y plane without being orthogonal to incident surface 10. Furthermore, both first surface 11 and second surface 12 may be surfaces inclined with respect to the X-Y plane without being orthogonal to incident surface 10.

Light guide member 1 may include direct optical path L1, and it is not essential that all of second incident light rays LT2 incident from incident surface 10 passes through direct optical path L1. That is, light guide member 1 may include, for example, an indirect optical path that is reflected one or more times by first surface 11 or second surface 12, then reflected by prism 3, and emitted from second surface 12.

Furthermore, instead of the plurality of prisms 3, only one prism 3 may be provided on first surface 11. In this case, prism 3 may include a plurality of reflecting surfaces 30 formed over the entire surface of first surface 11 and having different inclination angles.

In the first exemplary embodiment, although prism 3 is formed by processing first surface 11 of light guide member 1, the present disclosure is not limited to this aspect. For example, prism 3 may be provided on first surface 11 by bonding a prism sheet on which prism 3 is formed to first surface 11. In this case, one prism 3 or a plurality of prisms 3 may be formed on the prism sheet.

The shape of prism 3 is not limited to a concave shape with respect to first surface 11, that is, a shape recessed from first surface 11, and may be a convex shape with respect to first surface 11, that is, a shape protruding from first surface 11.

End surface 13 of light guide member 1 may be an inclined surface inclined with respect to incident surface 10 such that a distance from incident surface 10 in the Y-axis direction becomes more on second surface 12 side than on first surface 11 side. End surface 13 is such an inclined surface, and thus, even though a part of second incident light LT2 incident from incident surface 10 reaches end surface 13 without being incident on first surface 11, a part of second incident light LT2 can be emitted from second surface 12. That is, in a case where a part of second incident light LT2 incident from incident surface 10 is incident on end surface 13, the part of second incident light LT2 is totally reflected at end surface 13 toward second surface 12 and is emitted from second surface 12. As a result, in addition to the light emitted from second surface 12 to the outside of light guide member 1 through direct optical path L1, a part of second incident light LT2 reaching end surface 13 can also be effectively extracted from second surface 12.

Light distribution controller 14 may control the light distribution of the light extracted from second surface 12, and may be provided on at least one of first surface 11 and second surface 12. That is, in the above exemplary embodiment, although light distribution controller 14 is provided on second surface 12 as the emission surface, the present disclosure is not limited to this configuration, and light distribution controller 14 may be provided on first surface 11 or may be provided on both first surface 11 and second surface 12. Further, in the above exemplary embodiment, although light distribution controller 14 is integrated with light guide member 1 as the integrally molded product, the present disclosure is not limited to this aspect. For example, light distribution controller 14 may be provided on second surface 12 by bonding a light distribution sheet on which light distribution controller 14 is formed to second surface 12.

Light distribution controller 14 is not limited to the lens, and may be, for example, a diffusion sheet, a prism, a diffraction grating, or the like. Furthermore, light distribution controller 14 is not an essential configuration for optical system 100, and can be omitted as appropriate.

Moving body B1 on which display system 300 is mounted is not limited to the automobile (passenger car), and may be, for example, a large vehicle such as a truck or a bus, a two-wheeled vehicle, a train, an electric cart, a construction machine, an aircraft, a ship, or the like.

Display system 300 is not limited to a configuration in which a virtual image is displayed like a head-up display. For example, display system 300 may be a liquid crystal display or a projector device. Furthermore, display system 300 may be a display of a car navigation system, an electronic mirror system, or a multi-information display mounted on moving body main body B11.

Illumination system 200 is not limited to the configuration used in display system 300, and may be used, for example, in industrial applications such as resin curing or plant growing, or illumination applications including guide lamps.

(4) Summary

As described above, optical system (100) according to a first aspect includes light guide member (1), prism (3), and the plurality of light control bodies (2). Light guide member (1) includes incident surface (10) on which light is incident, and first surface (11) and second surface (12) facing each other. In light guide member (1), second surface (12) is an emission surface of light. Prism (3) is provided on first surface (11), and reflects light passing through an inside of light guide member (1) toward second surface (12). The plurality of light control bodies (2) are positioned between light source (4) and incident surface (10). The plurality of light control bodies (2) control light output from light source (4) and incident on incident surface (10). Each of the plurality of light control bodies (2) includes incident lens (21). Each of the plurality of light control bodies (2) causes light incident on incident lens (21) from light source (4) to be incident on incident surface (10). Directions of optical axes of light rays incident on incident surface (10) by at least two light control bodies (2) among the plurality of light control bodies (2) are different from each other.

According to this aspect, a luminance distribution of the light rays emitted from second surface (12) can be controlled by controlling the optical axes of the light rays incident on incident surface (10) for each of the plurality of light control bodies (2).

In optical system (100) according to a second aspect, in the first aspect, an angle formed by the optical axes of the light rays incident on incident surface (10) by at least two light control bodies (2) is more than 0 degrees and less than or equal to 15 degrees.

According to this aspect, the luminance distribution of the light rays emitted from second surface (12) can be controlled within an appropriate range on second surface (12).

In optical system (100) according to a third aspect, in the first or second aspect, incident lens (21) includes a plurality of lens units (22) having lens characteristics different from each other. Each of the plurality of light control bodies (2) causes the light rays incident on the plurality of lens units (22) from the corresponding one of the light sources (4) to be incident on incident surface (10). The directions of the optical axes of the light rays incident an incident surface (10) by at least two lens units (22) among the plurality of lens units (22) are different from each other.

According to this aspect, the luminance distribution of the light rays emitted from second surface (12) can be more finely controlled.

In optical system (100) according to a fourth aspect, in the third aspect, incident lens (21) is equally divided into a plurality of lens units (22) by a plurality of planes intersecting each other.

According to this aspect, the luminance distribution of the light rays emitted from second surface (12) can be more finely controlled.

In optical system (100) according to a fifth aspect, in the third or fourth aspect, the plurality of lens units (22) are smoothly continuous.

According to this aspect, light rays incident on the plurality of lens units (22) from light sources (4) can be effectively incident on incident surface (10).

In optical system (100) according to a sixth aspect, in any one of the third to fifth aspects, incident lens (21) has four lens units (22).

According to this aspect, the luminance distribution of the light rays emitted from second surface (12) can be more finely controlled.

In optical system (100) according to a seventh aspect, in any one of the third to sixth aspects, the plurality of lens units (22) includes refraction lens units that refract light rays and reflection lens units that reflect light rays.

According to this aspect, the luminance distribution of the light rays emitted from second surface (12) can be more finely controlled.

In optical system (100) according to an eighth aspect, in any one of the first to seventh aspects, light guide member (1) includes direct optical path (L1) along which light rays incident from incident surface (10) are directly reflected by prisms (3) and the light rays are emitted from second surface (12).

According to this aspect, light taking efficiency can be improved.

Illumination system (200) according to a ninth aspect includes optical system (100) according to any one of the first to eighth aspects and light source (4) that outputs light incident on incident surface (10).

According to this aspect, the luminance distribution of the light rays emitted from second surface (12) can be controlled.

Display system (300) according to a tenth aspect includes illumination system (200) according to the ninth aspect and display (5) that receives light emitted from illumination system (200) and displays an image.

According to this aspect, the luminance distribution of the light rays emitted from second surface (12) can be controlled.

Moving body (B1) according to an eleventh aspect includes display system (300) according to the tenth aspect, and moving body main body (B11) on which display system (300) is mounted.

According to this aspect, the luminance distribution of the light rays emitted from second surface (12) can be controlled.

According to the present disclosure, there is an advantage that the unevenness caused in the brightness of the image visually recognized by the user can be reduced.

REFERENCE MARKS IN THE DRAWINGS

1 light guide member
2 light control body
3 prism
4 light source
≡display
10 incident surface

11 first surface
12 second surface
21 incident lens
22 lens unit
100 optical system
200 illumination system
300 display system
B1 moving body
B11 moving body main body
L1 direct optical path

The invention claimed is:

1. An optical system comprising:
a plurality of light sources;
a light guide member having a rectangular plate shape, with a width direction being an X-axis direction, a depth direction being a Y-axis direction, and a thickness direction being a Z-axis direction, the light guide member having an incident surface onto which light from the plurality of light sources is incident in the Y-axis direction, and a first surface and a second surface facing each other in the Z-axis direction, with the second surface being an emission surface of light;
a prism that is provided on the first surface, the prism reflecting light passing through an inside of the light guide member toward the second surface; and
a plurality of light control bodies that are positioned between the light sources and the incident surface, the plurality of light control bodies controlling light rays output from the light sources and incident on the incident surface, wherein
the plurality of light control bodies are continuously connected to the incident surface of the light guide member without a seam, and the light guide member and the plurality of light control bodies are seamlessly integrated,
each of the plurality of light control bodies includes an incident lens facing one of the plurality of light sources in the Y-axis direction,
each of the incident lenses has a plurality of lens units that are divided when viewed from the Y-axis direction by a plurality of planes that intersect each other, and the plurality of lens units have different curvature distributions,
each of the plurality of light control bodies causes the light incident from a corresponding one of the light sources to the incident lens to be incident on the incident surface, and
directions of optical axes of light rays incident on the incident surface by at least two light control bodies among the plurality of light control bodies are different from each other.

2. The optical system according to claim 1, wherein an angle formed by the optical axes of the light rays incident on the incident surface by the at least two light control bodies is more than 0 degrees and less than or equal to 15 degrees.

3. The optical system according to claim 1, wherein the plurality of lens units of each of the incident lenses are smoothly continuous.

4. The optical system according to claim 1, wherein each of the incident lenses includes four lens units, each of which has a different curvature distribution.

5. The optical system according to claim 1, wherein the plurality of lens units of each of the incident lenses includes refraction lens units that refract light rays and reflection lens units that reflect light rays.

6. The optical system according to claim 1, wherein the light guide member includes a direct optical path along which the light rays incident on the incident surface are emitted from the second surface only by one-time reflection at prisms.

7. An illumination system comprising:
the optical system according to claim 1; and
the light sources that output the light rays incident on the incident surface.

8. A display system comprising;
the illumination system according to claim 7; and
a display that receives light emitted from the illumination system and displays an image.

9. A moving body comprising:
the display system according to claim 8; and
a moving body main body on which the display system is mounted.

10. The optical system according to claim 1, wherein
the prism has a length in the X-axis direction,
a plurality of the prisms are arranged at intervals on the first surface in the X-axis and Y-axis directions, and
from the incident surface, the plurality of the prisms included in even-numbered columns and the plurality of the prisms included in odd-numbered columns are arranged such that ends of the plurality of the prisms in the odd-number columns and ends of the plurality of the prisms in the even-number columns in the X-axis direction overlap in the Y-axis direction.

11. The optical system according to claim 1, wherein
the light guide member has an end surface in the Y-axis direction, and
the end surface is an inclined surface that is inclined with respect to the incident surface such that a distance from the incident surface to the end surface in the Y-axis direction is greater on a second surface side than on a first surface side.

12. The optical system according to claim 1, wherein
each of the incident lenses includes a refraction lens and a reflection lens, and
the refraction lens is provided in a circular shape in a center of the incident lens, and the reflection lens is provided in an annular shape surrounding an entire outer periphery of the refraction lens.

* * * * *